(12) United States Patent
Minette et al.

(10) Patent No.: US 9,274,246 B2
(45) Date of Patent: Mar. 1, 2016

(54) WELL-LOGGING TOOL FOR DETERMINING PROPERTIES IN A FLOWSTREAM

(75) Inventors: Daniel Carl Minette, Grove, OK (US); Harry D. Smith, Montgomery, TX (US); Phillip R. Phelps, Fort Worth, TX (US)

(73) Assignee: Probe Technologies, Houston, TX (US)

( * ) Notice: Subject to any disclaimer, the term of this patent is extended or adjusted under 35 U.S.C. 154(b) by 211 days.

(21) Appl. No.: 13/817,115

(22) PCT Filed: May 24, 2011

(86) PCT No.: PCT/US2011/037694
§ 371 (c)(1),
(2), (4) Date: Jun. 21, 2013

(87) PCT Pub. No.: WO2012/024008
PCT Pub. Date: Feb. 23, 2012

(65) Prior Publication Data
US 2013/0270431 A1     Oct. 17, 2013

Related U.S. Application Data

(60) Provisional application No. 61/375,058, filed on Aug. 19, 2010.

(51) Int. Cl.
*G01V 5/12*     (2006.01)
(52) U.S. Cl.
CPC .................... *G01V 5/12* (2013.01)

(58) Field of Classification Search
CPC ........................................... G01V 5/12
USPC ...................................... 250/269.3
See application file for complete search history.

(56) References Cited

U.S. PATENT DOCUMENTS

| | | | |
|---|---|---|---|
| 5,012,091 A * | 4/1991 | Moake | G01V 5/12 250/262 |
| 5,359,195 A | 10/1994 | Gartner | |
| 5,552,598 A | 9/1996 | Kessler | |
| 5,600,135 A | 2/1997 | Jacobson | |
| 2007/0240498 A1 * | 10/2007 | Scott | 73/61.43 |

OTHER PUBLICATIONS

Atkinson et al. A New Horizon in Multiphase Row Measurement. Winter 2004-2005. Oilfield 13-19, 22-30, 33-34, Review, p. 52-63.

(Continued)

*Primary Examiner* — David Porta
*Assistant Examiner* — Abra Fein
(74) *Attorney, Agent, or Firm* — Blank Rome LLP

(57) ABSTRACT

A full bore spectral gas holdup tool that measures gas holdup that is corrected for effects of the flowstream lamination and the salinity of the liquid in the flowstream. The basic methodology utilizes spectral data from two gamma ray detectors at different spacings from a nuclear source that emits gamma radiation. $^{57}$Co is the preferred source and the gamma ray detectors are scintillation spectrometers. In addition to a full bore gas holdup measurement, the spectral gas holdup tool also provides indications of the degree of flowstream lamination and the salinity of the liquid in the flowstream. An iterative data processing method optimizes the accuracy of the measured flowstream parameters.

44 Claims, 7 Drawing Sheets

(56) References Cited

OTHER PUBLICATIONS

Bamforth et al. Revitalizing Production Logging. Winter 1996. Oilfield Review, p. 44-60.

Joon-Ha Jin. Industrial Process Gamma Tomography. Final report of a coordinated research 2-6, 8-12, 14-19, 22-23, project 2OQ3. 2007. May 2008. International Atomic Energy Agency, p. 1-153.

PCT Search report and Written Opinion in PCT/US2011/037694.

* cited by examiner

A-A

WELL-LOGGING TOOL FOR DETERMINING PROPERTIES IN A FLOWSTREAM

CROSS REFERENCE TO RELATED APPLICATIONS

This application is a U.S. National Phase Application of PCT/US2011/037694, filed May 24, 2011, which claims priority based on U.S. Provisional Application Ser. No. 61/375,058 filed Aug. 19, 2010, both of which are hereby incorporated by reference in their entireties.

FIELD OF THE INVENTION

This invention is related to measurement of properties of a fluid flowstream, and more particularly related to a logging system that measures gas holdup, liquid component salinity, and the degree of fluid lamination in a borehole flowstream. Measurements are representative of flow within the entire flow conduit.

BACKGROUND

The determination and measurement of the different phases present in a multi-phase produced fluid flowstream in a cased wellbore is very useful information for oilfield operators in order for them optimize production from downhole reservoirs. Produced flowstreams typically comprise free gas, water, or oil in any combination thereof. Uniquely determining the gas phase (hereafter referred to as "gas holdup") present as a function of depth in a wellbore is particularly important. Many current generation production logging tools have had limited success in determining gas holdup since gas production often results in laminated, or partially laminated flowstreams, while the production logging tools, such as gamma-gamma fluid density logging tools, do not make measurements responsive to the full-bore flowstream. In the context of the art, the term "full-bore" means a measurement of liquid properties with virtually equal precision and accuracy over the entire cross section of the flow stream. Electrical resistivity based production logging tools have also been hampered by the fact that the electrical resistivities of oil and gas are both very high (and hard to distinguish), and the resistivity measurements are strongly dependent on the salinity of the water in the flowstream.

One relatively recent development of a full-bore gas holdup measurement tool is disclosed in U.S. Pat. No. 5,359,195. This tool used a low energy gamma ray source shielded from a very short-spaced gamma ray detector. Low energy gamma rays from the source are scattered primarily within the borehole fluid surrounding the tool and the scattered gamma radiation is detected by the gamma ray detector within the tool. All detected gamma rays are counted in a single measurement, which is then calibrated for the inside diameter ("ID") of the well casing, and subsequently converted into an estimate of gas holdup. The higher the recorded scattered gamma ray count rate, the lower the gas holdup. One feature of this measurement is that, due to the low gamma ray source energy, any gamma rays that penetrated the well casing and are scatted back toward the detector cannot re-penetrate the well casing due to photoelectric absorption. This effect advantageously makes the measurements made by the tool insensitive to variations in the properties of the materials outside the casing and sensitive to fluid properties within the casing. This measurement technique has been useful, but is limited by the fact that the single measurement made by the tool is sensitive to the flowstream lamination and salinity, in addition to gas holdup. Unfortunately, a single count rate measurement cannot be used to resolve three unknown parameters.

A modification of the method disclosed in U.S. Pat. No. 5,359,195 utilizes a separate additional gamma-gamma fluid density measurement, and is disclosed in U.S. Pat. No. 5,552,598. Using this modified method, a fluid density measurement is combined with a gas holdup measurement to qualitatively determine if flow is laminated or dispersed (homogeneous). Since the fluid density measurement is sensitive to the fluid only in the center of the borehole, and the gas holdup tool disclosed in U.S. Pat. No. 5,359,195 is a full-bore measurement, a difference gas in holdup between the two measurements is used as a qualitative indicator of laminated flow. The combination measurement disclosed in U.S. Pat. No. 5,552,598 is, however, still sensitive to water salinity effects and to situations when the gas and liquids are partially mixed. The system disclosed in U.S. Pat. No. 5,552,598 also requires the use of two separate gamma ray sources thereby creating associated handling, storage, and safety issues. The separate fluid density tool string and source also require additional capital and operational expenses.

SUMMARY OF THE INVENTION

In order to alleviate some of the problems in determining flowstream gas holdup with prior art logging systems described above, a spectral gamma ray gas holdup tool and logging system is presented in this disclosure. The tool and related data processing methodology will hereafter be referred to as the Spectral Gamma Holdup Tool or simply "SGHT". The SGHT utilizes a low energy gamma ray source such as $^{57}$Co, however the process is also applicable to the utilization of any nuclear source which emits gamma rays in the range between ~75 kiloelectron Volts (keV) and ~150 keV). The source is centered within the essentially cylindrical SGHT outer tool casing. Two scintillation type gamma ray detectors, such as sodium iodide (NaI) detectors and the associated photomultipliers, are disposed circumferentially near the outer tool casing and on opposite sides of the source. This tool geometry yields a full-bore response. The detectors are disposed axially at different distances from the source, with the near detector being hereafter referred to as the "short spaced detector" and the far detector being hereafter referred to as the "long spaced detector". The source is preferably disposed axially between the short spaced and long spaced detectors. In an alternate embodiment, both detectors can be positioned on the same side of the source at different axial source-to-detector spacings. The tool is preferably run centralized inside a conduit which fluid flows such as the steel wellbore tubular casing. Shielding is placed between the source and each of the gamma ray detectors to prevent a significant number of scattered gamma rays from reaching the detector axially through the tool body. As mentioned below, one possible embodiment of the design will allow for a predetermined small number of unscattered gamma rays to reach the crystal(s) to serve as a calibration energy peak. Other embodiments would prevent any unscattered as well as any scattered gamma rays from reaching the detectors.

The use of two different source-to-detector spacings in the SGHT has proven useful, in part because the relative effects of the degree of flowstream lamination are not the same at the two spacings. The transport of gamma rays in a homogeneously distributed medium is generally different from transport of gamma rays through two distinct layers having the same average density as the homogeneous layer. This effect is somewhat analogous to waveguide phenomena. Additionally there are gamma ray spectral differences in the different-spaced detectors in a laminated vs. a homogeneously distributed flowstream. There are also gamma ray energy spectral differences recorded in the two detectors, as well as in the overall shape of the energy spectrum recorded in each detector, due to changes in the salinity of the fluid (the liquid component) in the flowstream. Chlorine (and to a lesser degree sodium or one of the other cations) in salt water in a multi-phase flowstream has a much higher effective atomic number ("Z") than the hydrogen, carbon, and oxygen present in oil or fresh water. Therefore low energy scattered gamma rays are more susceptible to photoelectric absorption if chlorine (in salt water) is present in the flowstream. Therefore, if the tool housing is designed comprising "low-Z" materials over the detectors in order to permit passage of low energy gamma radiation, the shapes of the detected spectra are sensitive to salinity differences distinct from other flowstream parameters.

Detector count rate data are measured in a plurality of energy ranges using the gamma ray spectral capability of the long and short spaced detectors. These measurements comprise an over determined set of data which is combined to determine gas holdup corrected for water salinity and the degree of stratification, as well as discrete measures of water salinity, and degree of stratification of the flow stream. The results are then iterated until convergence criteria are met thereby optimizing the accuracy and precision of the three flow stream parametric measurements.

The SGHT system will be disclosed embodied as a well logging system. It should be understood the system could be deployed in essentially any flow stream with proper tool calibration. This includes pipelines, inputs and outputs of gas-oil separation units, and the like.

BRIEF DESCRIPTION OF THE DRAWINGS

The manner in which the above recited features and advantages, briefly summarized above, are obtained can be understood in detail by reference to the embodiments illustrated in the appended drawings.

FIG. 3 is a cross sectional view of the short spaced detector crystal 18a;

DETAILED DESCRIPTION OF THE PREFERRED EMBODIMENTS

The detailed description of the SGHT will be described in detail in the following section. The system hardware is first presented. Basic tool response will next be disclosed. Responses were simulated using the Monte Carlo MCNP-X code. Finally, data processing methodology will be presented using specific production logging examples.

The SGHT is disclosed as a wireline logging system. The system can also be used as a tubing conveyed logging tool or a pump-down tool with spectral data being recorded in the tool for subsequent analysis at the surface of the earth. The tool can also be embodied conceptually as a logging-while-drilling (LWD) or measurement-while-drilling (MWD) providing that low Z material inserts can be disposed in the region of the source and gamma ray detectors. In this embodiment, measurements would typically be made when "tripping" the drill string rather than when advancing the borehole.

System Hardware

Figure 1:
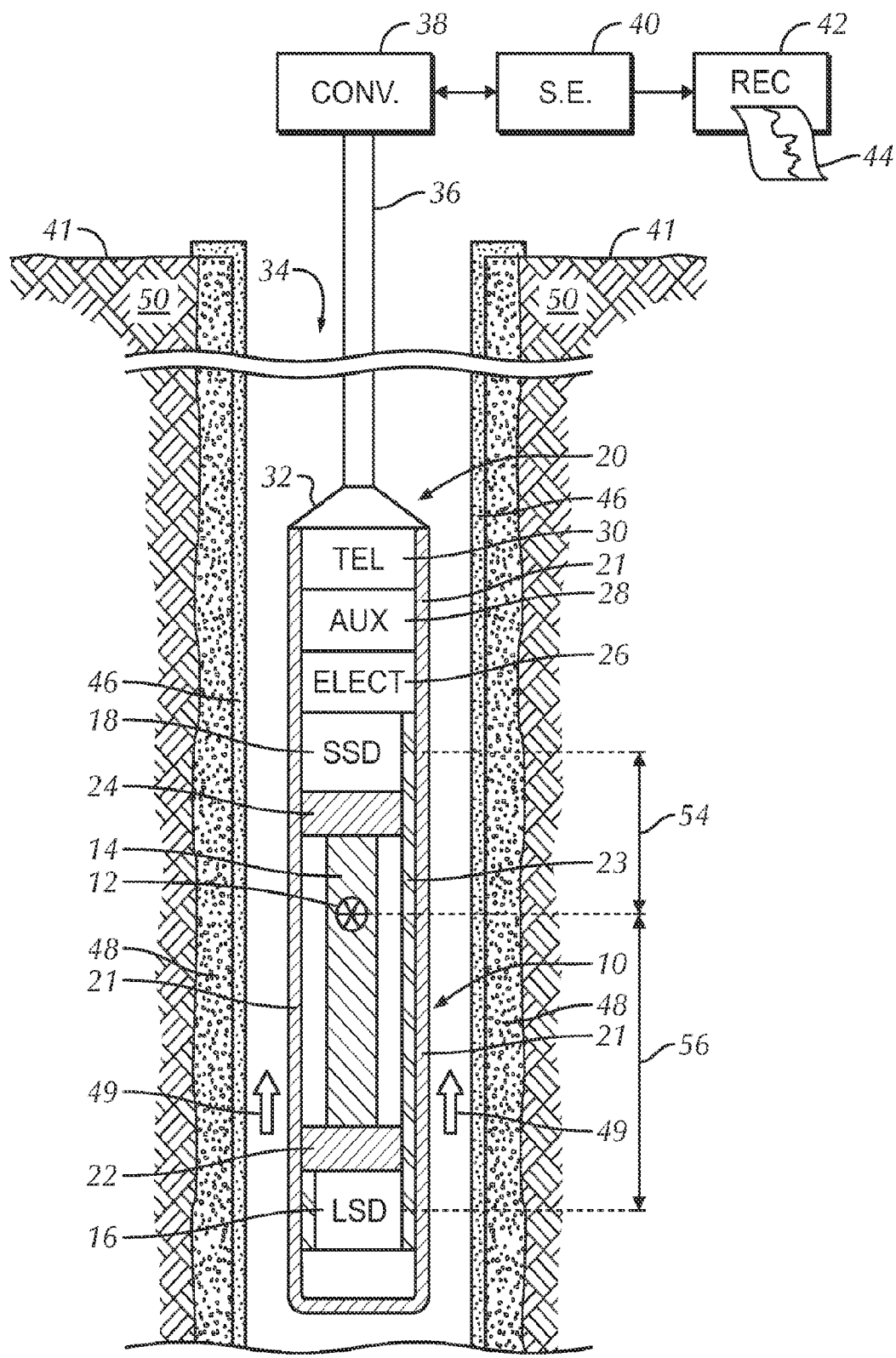
FIG. 1 illustrates the major elements of the SGHT logging system operating in a well borehole environment.

FIG. 1 illustrates the major elements of the SGHT logging system operating in a well borehole environment. The entire downhole apparatus, identified as a whole by the numeral 10, is suspended by a data conduit 36 in a well borehole 34 penetrating earth formation 50. The lower end of a data and/or power conduit 36 is operationally connected to the downhole assembly by means of a suitable connector 32. The upper end of the data conduit 36 is operationally attached conveyance means 38. The borehole is cased with a tubular casing 46, and the annulus defined by the formation 50 and the outer surface of the casing 46 is filled with a grout 48 such as cement. There is a fluid flowstream in the casing as identified conceptually by the arrows 49. Surface equipment 40 at the surface of the earth 41 is shown operationally connected to the conveyance means 38. The surface equipment 40 comprises various elements including an uphole telemetry element (not shown) and an uphole processor (not shown). A recording means 42 cooperates with the surface equipment 40 to generate one or more "logs" 44 of computed parameters of interest measured as a function depth of the tool 10 within the borehole.

Again referring to FIG. 1, if the SGHT tool 10 is embodied as a wireline system, the conveyance means 38 would be a cable draw works and the data conduit 36 would be a wireline cable. If the SGHT tool 10 is embodied in a coil tubing system, the conveyance means 38 would be a tubing injection unit and the data conduit 36 would be coiled tubing. If the SGHT tool 10 is embodied in a MWD/LWD unit, the conveyance means 38 would be a drilling rig and the data conduit 36 would be drill pipe. The system will be disclosed as a wireline logging system therefore the data conduit 36 is a wireline cable comprising one or more conductors, and the conveyance means 38 is a logging system draw works comprising a motor, a winch, and tool depth measuring apparatus.

Still referring to FIG. 1, the downhole apparatus, identified as a whole by the numeral 20, comprises the spectral gamma ray logging tool (SGHT) identified as a whole by the numeral 10. The other elements, to be discussed subsequently, are typical subsections found in a downhole assembly of a wireline logging system. The SGHT 10 comprises a short spaced spectral gamma detector 18, a long spaced spectral gamma ray detector 16 a nuclear source that emits gamma radiation and tungsten shields 22 and 24 that shield the long space detector 16 and short spaced detector 18, respectively, from primary gamma radiation emitted by the source 12. A conduit 23 is uses as a wire pathway between the long and short spaced detectors. It should be understood that other electronics such as a processor and control electronics can also be disposed in the conduit 23. The entire SGHT 10 is encased in a tool housing 21, which will subsequently be discussed in detail.

Still referring to FIG. 1, the downhole apparatus 20 as shown comprises an electronics subsection 26 which can alternately comprise a downhole processor and other electronic circuits to further assist in control the operation of the SGHT 10. An optional auxiliary subsection 28 is also illustrated. The auxiliary subsection 28 can comprise electromagnetic, acoustic or nuclear systems to make additional flow stream property measurements. A downhole telemetry subsection 30 is used to communicate with the uphole telemetry system (not shown) element preferably disposed within the surface equipment 40.

Figure 2:
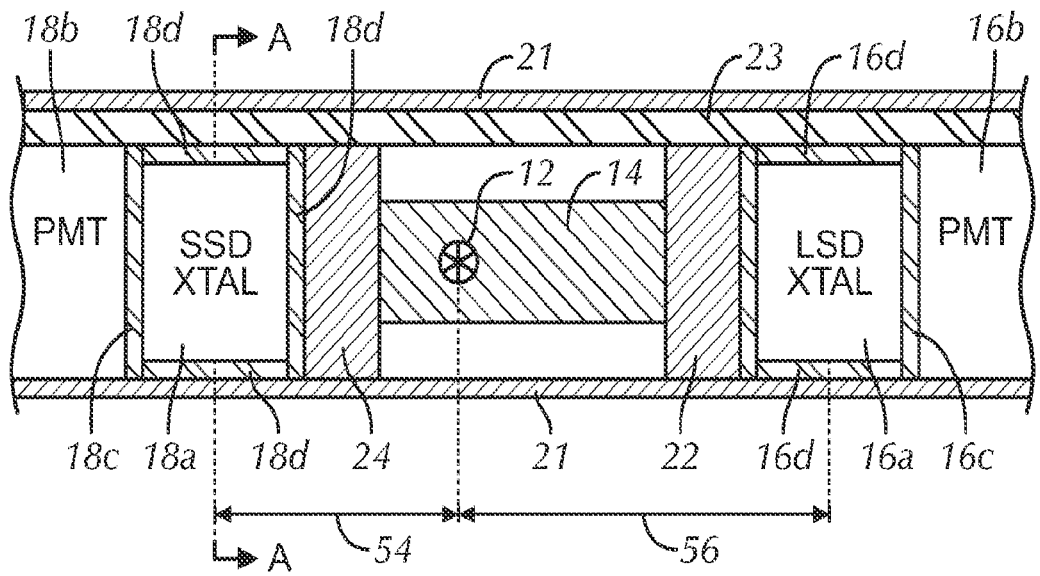
FIG. 2 is a side view of the SGHT illustrating in more detail the various elements.

FIG. 2 is a side view of the SGHT illustrating in more detail the various elements. The long space detector and short space detectors, respectively, comprise scintillation crystal 16a and 18a optically coupled to photomultiplier tubes 16b and 18b. For brevity, only the long space detector will be described in detail since the short spaced detector is similar in construction. The scintillation crystal 18a and photomultiplier tube 18b optically coupled at 18c. The housing 21 over the scintillation crystal material and photomultiplier tube is a concentrically layered cylindrical composite, as will be shown detail in FIG. 3. The composite comprises an outer titanium (or possibly thin steel) layer to provide strength and corrosion/abrasion resistance, and an inner layer of a "low-Z" material, such as plastic (e.g. Torlon), which provides additional support, but also provides much less attenuation of the lower energy detected gamma rays below ~60-80 keV. A light-reflecting powder is shown at 18d. Once again, the cylindrical composite is shown in more detail in FIG. 3. Corresponding elements of the long spaced detector are shown at 16a through 16d.

Still referring to FIG. 2, the gamma ray emitting source 12 is shown removably disposed in a low Z material 14 which is positioned axially between the long and short spaced detectors 16 and 18, respectively. High density and high Z material 22 and 24, such as tungsten, shields the long and short spaced detectors from direct radiation from the source 12. The wireway is again identified at 23 and the outer tool casing at 21. The source is preferably low energy gamma ray source such as $^{57}Co$, and the scintillation crystals 16a and 18a are preferably sodium iodide. $^{57}Co$ emits a gamma ray at 122 keV, and is selected such that, as described above in the previously discusses system disclosed in U.S. Pat. No. 5,359,195, no scattered gamma rays can reach the detectors after penetrating the steel well casing 46. The data detected by both the short spaced and long spaced detectors are processes spectrally, such that it is possible in each detector to distinguish and count gamma rays detected in multiple selected energy ranges. Processing can be done in the previously mentioned downhole processor, or measured or "raw" data can be telemetered to the surface for processing in a surface processor. This process will be described in detail in a subsequent section of this disclosure.

Once again referring to FIG. 2, short and long spaced detector spacings are indicated at 54 and 56, respectively. The main point is that the two detectors need to be at different axial distances from the source 12. It has been determined from Monte Carlo modeling with the MCNP-X code that for purposes of the example wireline system disclosed, the short spaced detector 18 should be positioned approximately 1.00 inch (2.54 centimeters) or less from the source 12 and the long spaced detector 16 should be placed approximately 2.00 inches (5.08 centimeters) or more from the source, although these spacings 54 and 56 may be different for tools with different casing diameters, different detector types, and the like.

Although not shown in FIG. 2, the tungsten (or other high density and high-Z) shielding material 22, 24, may also incorporate a tiny "pinhole" path straight through between the source 12 and each detector 16 and 18 to permit a very small percentage of the unscattered gamma rays from the source to reach the each detector. This "primary" unscattered radiation provides a peak in each detected gamma ray spectrum above the energies of all of the scattered gamma rays of interest. These uncollided gamma rays can be subsequently be used to provide gain stabilization of the detector assemblies, using techniques well known in the art. Gain stabilization can occur in circuitry disposes within the conduit 23, the electronics subsection 26, or even in the surface processor within the surface equipment 40.

Figure 3:
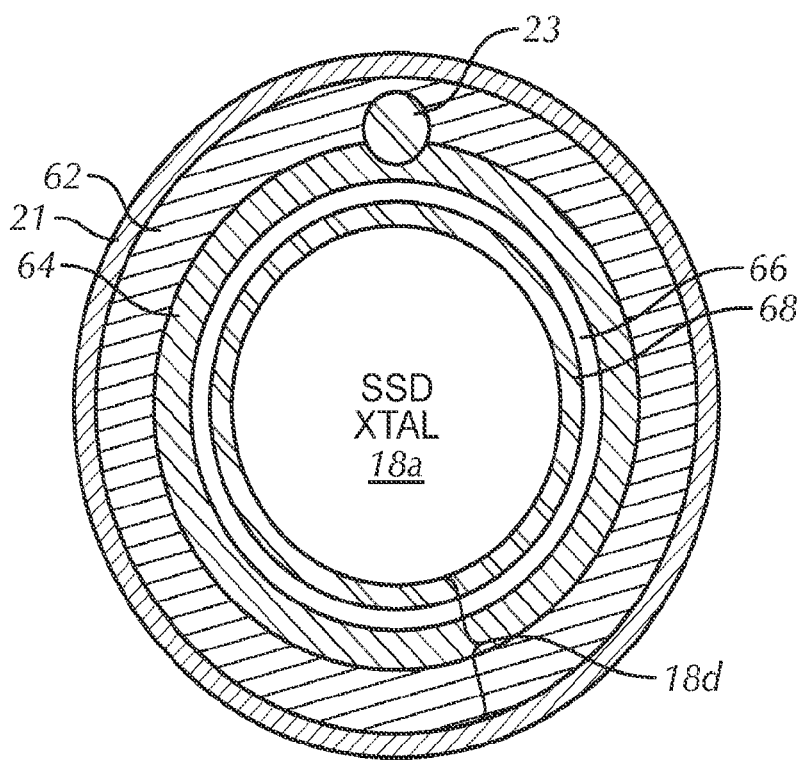

FIG. 3 is a cross sectional view A-A (see FIG. 2) of the short spaced detector crystal 18a. The cross sectional of the long spaced detector is essentially identical. The outer tool housing 21 is preferably titanium. The wireway conduit 23 shown in cross section, can also house electronic circuitry, power supplies, memory and the like to operate the SGHT, as mentioned previously. This allows the SGHT assembly 10 to operate as a stand-alone device if so desired. Plastic material 62, such as Torlon©, is disposed inside the titanium outer tool housing layer 21. The plastic material 62 and the use of titanium rather than steel in the tool housing 21 both facilitate transmission of low energy gamma rays into the scintillation crystal 18a. The crystal housing 64 is made of aluminum instead of steel in order to facilitate transmission of low energy gamma rays into the detector crystal 18a. Another layer of low Z plastic is shown at 66. Reflective powder 68 is disposed just outside the scintillation crystal 18a.

Figure 4:
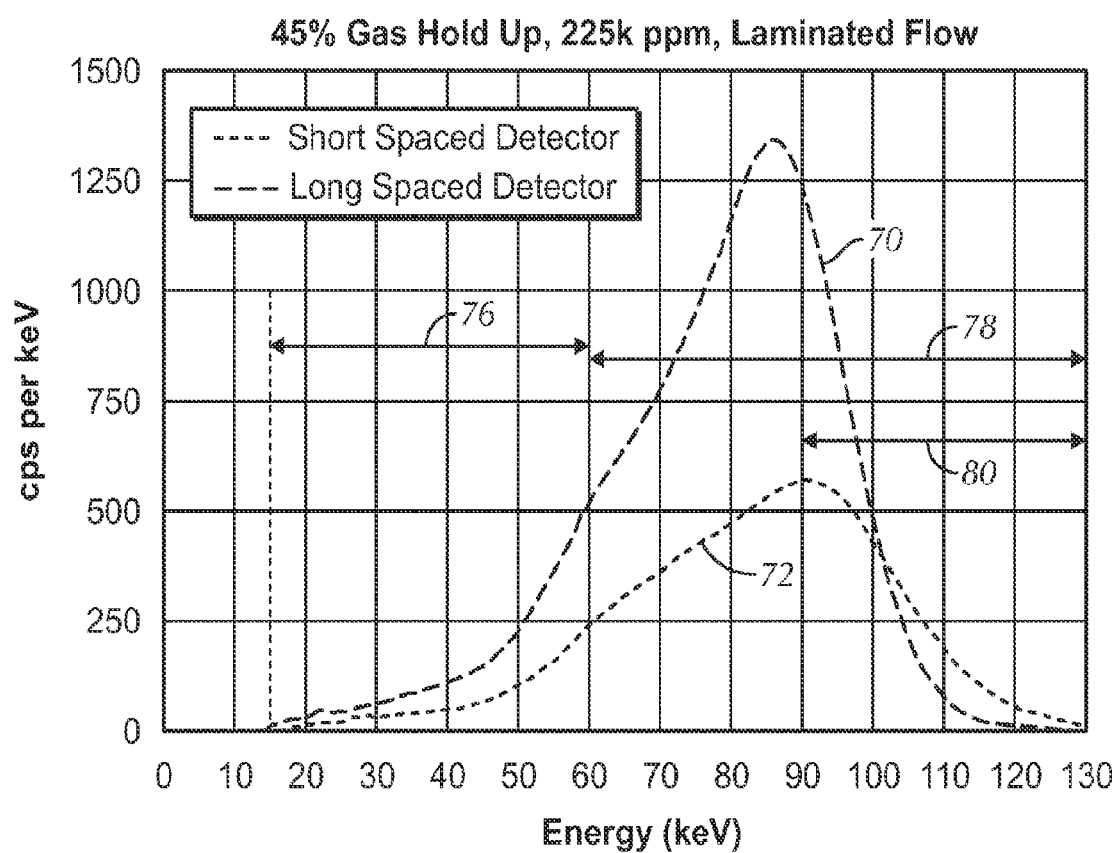
FIG. 4 illustrates gamma ray energy spectra measured by the short spaced detector and the long spaced detector.

FIG. 4 illustrates gamma ray energy spectra measured by the short spaced spectral gamma ray detector (curve 70) and the long spaced spectral gamma ray detector (curve 72). The ordinate is in units of counts per second per keV and the abscissa is energy "E" in units of keV. This particular illustration is for a flowstream comprising 45% gas, 55% water having 225 thousand parts per million ("k ppm") salinity, and with a fluid distribution that is 100% laminated. The ID of the casing is 6 inches (15.2 centimeters) and the source is $^{57}Co$. The spectral regions used in the determination of the flow stream parameters of energy are E=15-60 keV shown at 76, E>60 keV shown at 78, and E>90 keV shown at 80.

While the particular embodiment comprising the tool housing, source, shielding, and detectors shown in FIGS. 2 and 3 have been proven to provide significantly improved measurements compared to prior art gas holdup tools, the implementation of the current technique is not dependent on the exact design shown in these drawings, the exact number of measurements/count rates taken from the observed spectra, or the exact combinations of those measurements, as discussed in subsequent sections of this disclosure. As examples, other placement of materials or changes in the materials (e.g. substituting carbon fiber material for plastic) will not change the basic functionality of the invention. Nor will the particular selection of count rates taken from the spectra. One could envision a tool utilizing different choices of energy ranges, or a different number of measurements selected from the spectral data (e.g. six instead of five). The inherent nature of the invention is broad: the use of the information/measurements obtained from spectral data from detectors placed at different distances from a gamma ray source to obtain a more accurate gas holdup measurement (much less sensitive to the fluid salinity and the degree of lamination of the flowstream). The process also provides simultaneous estimates of the fluid salinity and the degree of flowstream lamination.

To summarize the hardware, the SGHT hardware is designed to produce long and short spaced detector count rates in different energy ranges and at different distances from a $^{57}$Co source. These count rates, and measurements, derived from combinations of the count rates, are designed to have differing sensitivities to gas holdup, liquid phase salinity, and the degree of flowstream fluid lamination. An iterative/perturbation-based process employing these count rate measurements (and reference data specific to the ID of the well casing) is described in detail in subsequent sections of this disclosure. These sections discloses in detail how the selected spectral count rates are recorded, combined, and processed to provide the gas holdup, salinity, and lamination measurements, and presents an example to illustrate the utility of the new method.

Basic Response of the SGHT System

Basic SGHT response to gas holdup, degree of flowstream lamination, and water salinity in a two-phase mixture of gas and water is presented as example using 6 inch (15.2 centimeters) ID casing, a short spaced detector of 0.72 inches (1.83 centimeters) and a long spaced detector spacing of 3.00 inches (7.6 centimeters). Monte Carlo modeling has resulted in the selecting (from the measured spectral data from each detector) five measurements that are sufficiently different in their relative sensitivity to differences in gas holdup, water salinity, and degree of lamination. When combined, these differences not only yield a good estimate of gas holdup, but also are used to obtain estimates of water salinity and degree of fluid lamination. These five measurements, in counts per second (cps) are:

1) Total cps for energies E>15 keV. 15 keV was selected as the cutoff energy to -minimize the possibility of electronics noise contaminating the signal.
2) The cps for E=15 keV to 60 keV.
3) The cps for E>60 keV.
4) The cps for E>90 keV
5) The ratio (cps E=15 keV to 60 keV)/(cps E>60 keV)

Figure 5:
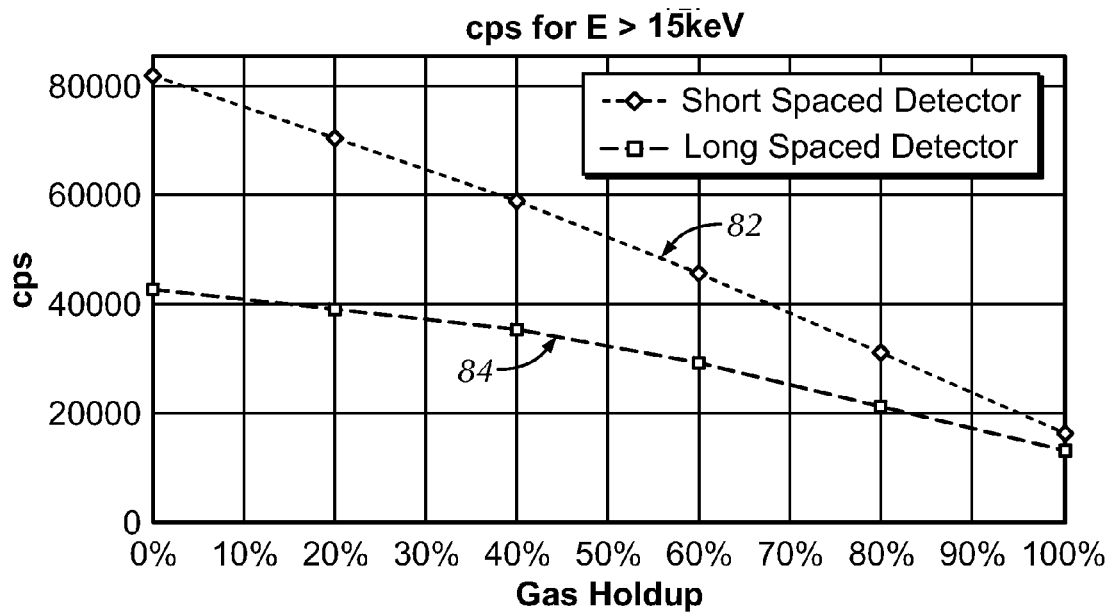
FIG. 5 shows counts per seconds as a function of gas holdup in the energy region E>15 keV for the short and long spaced detectors.
Figure 6:
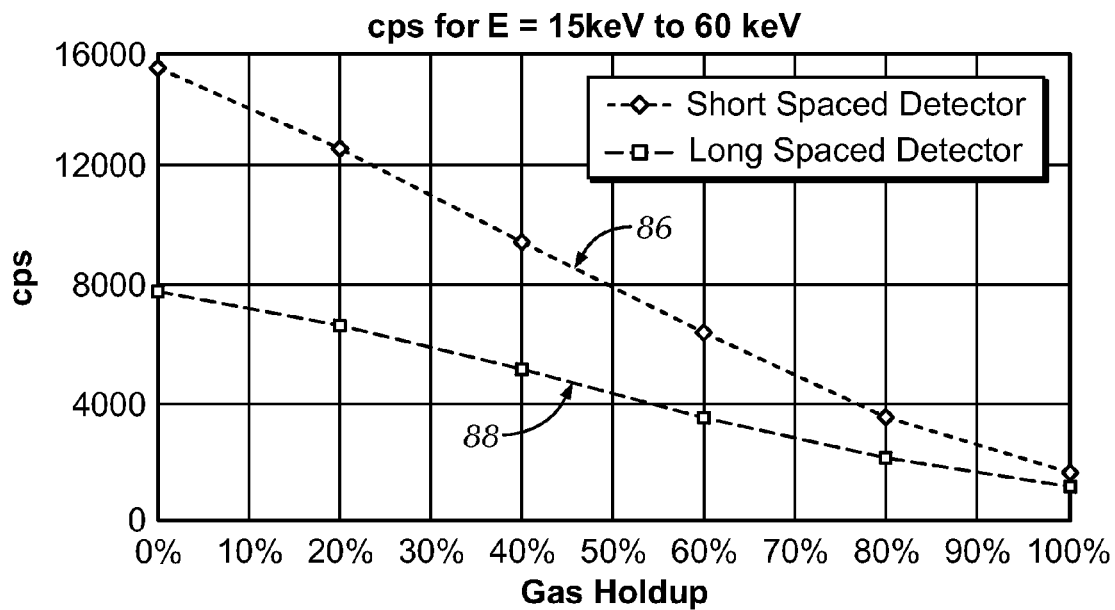
FIG. 6 shows counts per seconds as a function of gas holdup in the energy region E=15 keV to 60 keV for the short and long spaced detectors.
Figure 7:
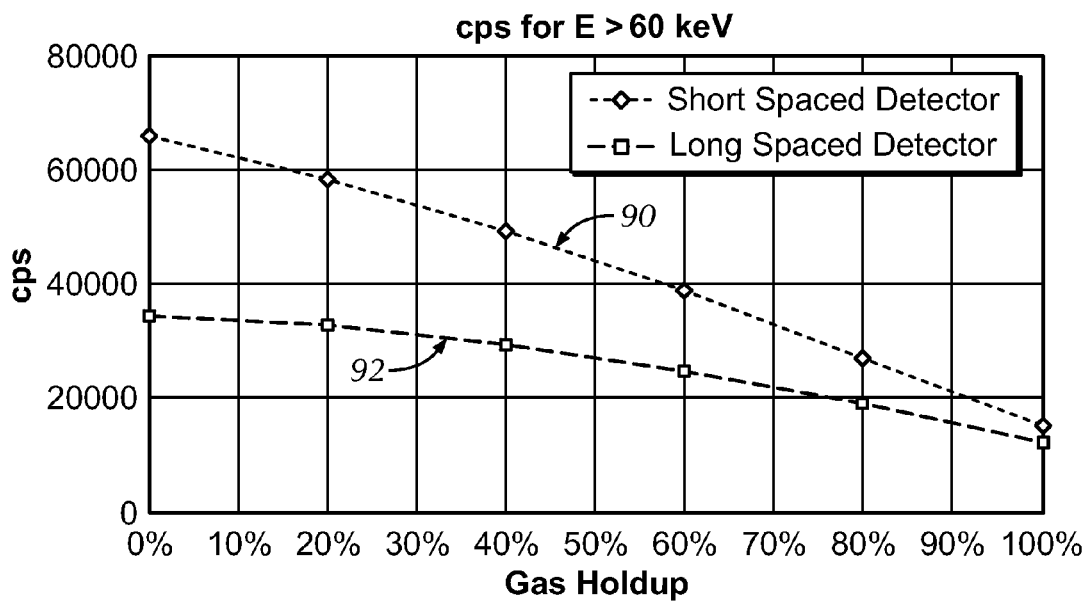
FIG. 7 shows counts per seconds as a function of gas holdup in the energy region E>60 keV for the short and long spaced detectors.
Figure 8:
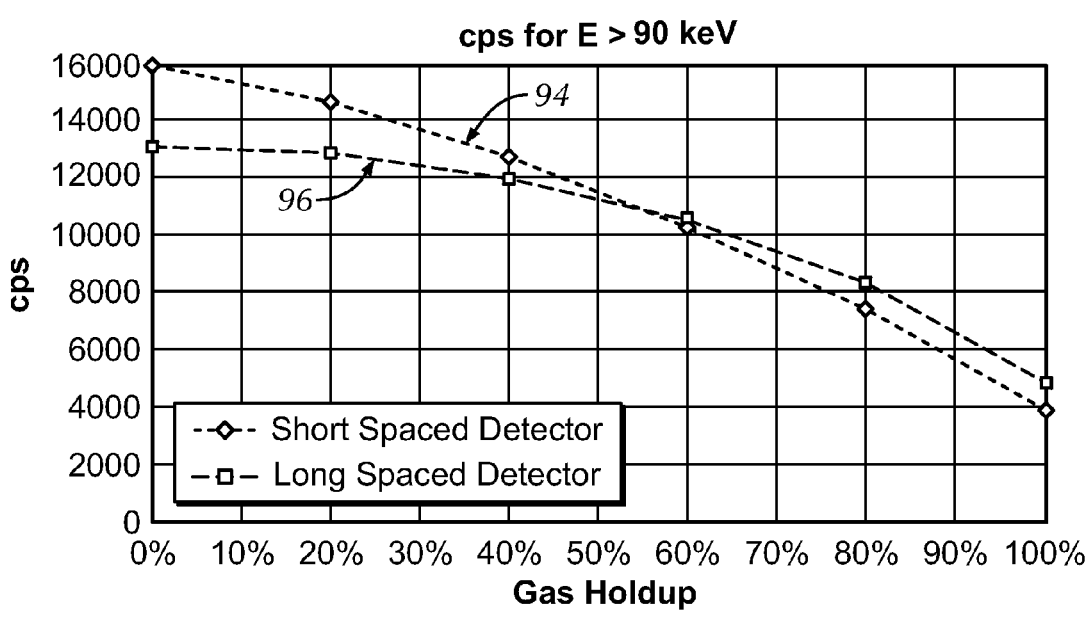
FIG. 8 shows counts per seconds as a function of gas holdup in the energy region E>90 keV for the short and long spaced detectors.
Figure 9:
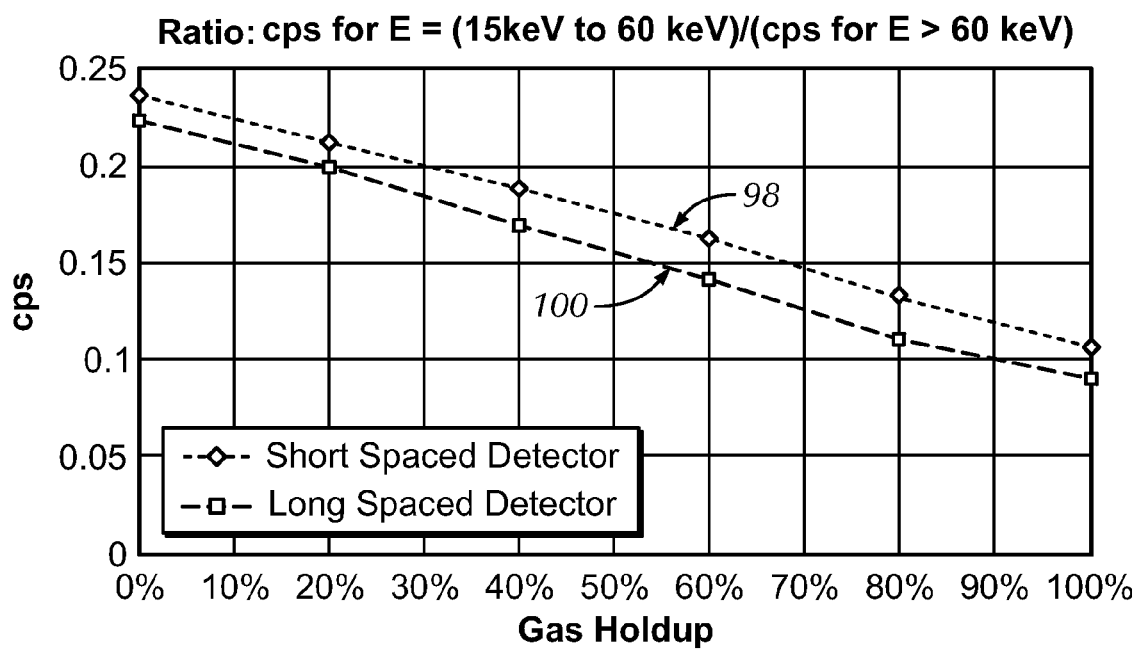
FIG. 9 shows the ratio of counts per seconds as a function of gas holdup in the energy region (E=15 keV to 60 keV)/(E>60 keV) for the short and long spaced detectors.

The measurements related to spectral energy region measurements are shown graphically in FIG. 4. These measurements for the long and short spaced detectors are translated into gas holdup measurements via the use of the homogenous fresh water response. The response for the five measurements given above are presented in FIGS. 5-9. FIG. 5 shows counts per seconds as a function of gas holdup in the energy region E>15 keV as curves 82 and 84 for the short and long spaced detectors, respectively. FIG. 6 shows counts per seconds as a function of gas holdup in the energy region E=15 keV to 60 keV as curves 86 and 88 for the short and long spaced detectors, respectively. FIG. 7 shows counts per seconds as a function of gas holdup in the energy region E>60 keV as curves 90 and 92 for the short and long spaced detectors, respectively. FIG. 8 shows counts per seconds as a function of gas holdup in the energy region E>90 keV as curves 94 and 96 for the short and long spaced detectors, respectively. Finally, FIG. 9 shows the ratio of counts per seconds as a function of gas holdup in the energy region (E=15 keV to 60 keV)/(E>60 keV) as curves 98 and 100 for the short and long spaced detectors, respectively. Algorithms for the transforms given by each of the ten curves shown FIGS. 5-9 are developed which to give gas holdup as a function of count rate (cps) or the degree of gas holdup as a function of ratio, depending on the curve in question. The algorithms are piecewise linear fits between the points shown in the plots. It should be noted that gas holdup can also be determined from the response of a single detector by combining the response of the detector in two spectral energy regions. This is illustrated graphically in FIG. 9.

Data shown graphically in FIGS. 5-9 are the foundation of all of the SGHT flowstream measurements. More specifically, the energy region data taken from the measured scattered gamma ray spectra shown graphically in FIGS. 5-9 are used in an appropriate response function to obtain flowstream parameters of interest.

Recall that data shown in FIGS. 5-9 assume a homogenous fresh water flow stream. Therefore, if the fluid (liquid) is fresh water is homogeneously mixed with the gas in an "unknown" flowstream encountered within a borehole, gas holdup can be obtained from any energy region measurement using the appropriate curve or curves in FIGS. 5-9. The proper response function has been used, and the only errors in the response should be small statistical errors. However, it cannot be assumed that the salinity of the fluid or fluid flow regime is known in a flow stream encountered within a well borehole in field operations. Since both fluid flow lamination and salinity affect the response of both the long and short spaced detectors, a technique has been developed to compensate the estimated gas holdup for salinity and/or lamination effects.

The first step in this is utilizing these previously discussed five measurements from both the short and the long spaced detector, and combinations thereof. Again, these measurements are shown graphically in FIGS. 5-9. Three different measurements, or combinations of measurements, are sought. They are:

1) a measurement of gas holdup that would be minimally affected by salinity and lamination. This is defined as the primary measurement of gas holdup, termed "basic gas holdup";
2) a measurement of gas holdup that had a large salinity effect and a small lamination effect. This measurement is used to develop a salinity estimate; and
3) a measurement of gas holdup that has a large lamination effect and a small salinity effect. This is used to estimate the degree of fluid lamination.

This has been done using the spectral gamma ray count rates in the specified energy ranges and ratios described above. The following combinations of these measurements have been found provide the best response for each of these three:

Basic Gas Holdup Measurement

The basic gas holdup measurement is obtained from the average of A and B, where:

A is the gas holdup measurement obtained by using the short spaced detector response at E>90 keV cps (and the corresponding homogenous response curve for the short spaced detector shown in FIG. 8).

and

B is the gas holdup measurement obtained by using the short spaced detector energy region response ratio (and corresponding the homogenous response curve for the short spaced detector shown in FIG. 9).

This gas holdup measurement is used to obtain a gas holdup measurement with the smallest total error caused by uncertainties in fluid salinity and degree of lamination.

Salinity Effect Gas Holdup Measurement

The salinity effect on the gas holdup measurement is obtained from the average of C and D, where:

C is the gas holdup measurement obtained by using the long spaced detector response in the energy region 15-60 keV cps (and the corresponding homogenous response curve for the long spaced detector shown in FIG. 6).

and

D is the gas holdup measurement obtained by using the long spaced detector energy region response ratio (and the corresponding homogenous response curve for the long spaced detector shown in FIG. 9).

This gas holdup measurement is used to obtain an estimate of the salinity of the fluid phase of the flowstream.

Lamination Effect Measurement

The fluid lamination measurement is obtained from the difference (E-F), where:

E is the gas holdup measurement obtained by using the short spaced energy region ratio (and the corresponding homogenous response curve for the long spaced detector shown in FIG. 9).

and

F is the gas holdup measurement obtained by using the long spaced energy region response >90 keV cps (and the corresponding homogenous response curve for the long spaced detector shown in FIG. 8).

This measurement is used to obtain an estimation of the degree of lamination in the fluid. Since it is obtained from the difference between two gas holdup measurements, it itself is not directly related to gas holdup. For example, it is zero at both 0% and 100% gas holdup. It is, however, dependent on gas holdup, with zero values at 0% and 100%, and maximum values at ~40% to ~60% gas holdups. The (E-F) difference is not intended to be a measure of gas holdup, but rather is designed to increase as the degree of flowstream lamination increases, yet not be strongly related to fluid salinity changes. It is the combination of two of 10 short spaced detector spectral measurements and long spaced detector spectral measurements which shows the strongest dependence on lamination. In the following discussion, it will be demonstrated that a lamination measurement can be obtained by first determining the value of E-F for full lamination and then comparing the value of E-F measured by the tool to this value to obtain the lamination percentage.

These three fundamental measurements provide a good basis for the system correction algorithm. Perturbation theory is used in an iterative process. Briefly, initial estimates of gas holdup, salinity, and lamination are computed, and then two of these parameter of interest estimates/measurements are used sequentially to make a better estimate of the third measurement. The three corrected measurements are then taken as a new starting point and the process is iteratively repeated. In this disclosure, the first iteration for the process will be examined and detailed. The iterative process should yield noticeably smaller gas holdup errors after the first iteration.

The first three sets of measurements are examined, and then the process of correction is disclosed in detail. The first step in this process involves the three measurements listed above, and determining the errors for each (relative to the homogeneous fresh water response functions described in FIGS. 5-9) for count rates and ratios computed for 6 different gas holdups we are considering (0%, 20%, 40%, 60%, 80%, & 100%), and for 5 different fluids. The flowstream fluids examined are:

1) Laminated fresh water
2) Laminated 125 k ppm NaCl
3) Laminated 250 k ppm NaCl
4) Homogenous 125 k ppm NaCl
5) Homogenous 250 k ppm NaCl These six gas holdups and five different fluid conditions will be the basis for the perturbation process. A 5×6 matrix for each of the three measurements listed above (basic gas holdup, salinity effect, and lamination effect) are developed from MCNP SGHT tool modeling data. The count rates/ratios recorded in each detector in the spectral energy ranges listed above (e.g. the short spaced count rate computed for 15 keV to 60 keV) and the ratio out of the MCNP model for each of the 30 input conditions are input into the corresponding response functions represented graphically by the appropriate curve in FIGS. 5-9 in order to develop anticipated gas holdup values. (continuing with the example given above, the short spaced count rate for 15 keV to 60 keV utilized the short space response is labeled 86 in FIG. 6) These holdup values are then combined, as described above, into the basic gas holdup measurement, the salinity measurement, and the lamination measurement. The resulting three matrices present the computed apparent indicated gas holdup for each of the 6 input gas holdups and 5 fluids under consideration (relative to the homogeneous fresh gas holdup response).

The computed response matrix for the basic gas holdup measurement is shown in Table 1. Table 2 gives the gas holdup errors in the basic gas holdup measurement, which we calculate, using equation. (1):

$$\text{Gas Holdup Error} = \text{Measured Gas Holdup} - \text{Actual Gas Holdup}. \quad (1)$$

As an illustration of how one data point in Table 1 is obtained, consider the point for laminated conditions, with fresh water fluid and a gas holdup of 40%. If, for that condition, if one uses MCNP to compute the count rate above E=90 keV in the short spaced detector, and then enters that count rate into FIG. 8, one obtains an apparent gas holdup. Similarly, if the MCNP ratio (SS cps for E=15 keV to 60 keV)/(SS cps for E>60 keV) is used as an input to FIG. 9, one obtains a second apparent gas holdup. Averaging these two holdups together, the process which defines the "basic gas holdup" measurement, one obtains an apparent holdup of 38.83%. That means that for an assumed response equations for homogeneous fresh water conditions with a 40% gas holdup, but the actual conditions encountered in "field" conditions were laminated fresh water with a 40% gas holdup, the computed gas holdup would be 38.83%, not 40% (as underlined in Table 1).

The gas holdups obtained with the Salinity Effect Measurement are shown in Table 3, and the Lamination Effect Measurement matrix is shown in Table 4. The software calculates the errors caused by salinity and lamination from these, producing matrices similar to Table 2.

TABLE 1

"Basic Gas Holdup Measurement" Measured Gas Holdup Using the Homogeneous Fresh Response to Determine Gas Holdup in a Different Flow and/or Salinity Regime

| | Actual Gas Holdup | | | | | |
| --- | --- | --- | --- | --- | --- | --- |
| | 0% | 20% | 40% | 60% | 80% | 100% |
| Laminated 0k Salinity | 0.00% | 15.70% | <u>38.83%</u> | 60.43% | 81.93% | 100.00% |
| Laminated 125k Salinity | 6.05% | 19.60% | 43.02% | 62.29% | 81.86% | 100.00% |

TABLE 1-continued

"Basic Gas Holdup Measurement" Measured Gas Holdup Using the Homogeneous Fresh
Response to Determine Gas Holdup in a Different Flow and/or Salinity Regime

| | Actual Gas Holdup | | | | | |
|---|---|---|---|---|---|---|
| | 0% | 20% | 40% | 60% | 80% | 100% |
| Laminated 250k Salinity | 11.47% | 23.60% | 46.43% | 65.47% | 82.54% | 100.00% |
| Homogeneous 125k Salinity | 6.05% | 22.07% | 39.87% | 59.68% | 78.57% | 100.00% |
| Homogeneous 250k Salinity | 11.47% | 24.68% | 40.67% | 58.98% | 77.39% | 100.00% |

TABLE 2

"Basic Measurement" Gas Holdup Measurement Errors From Using the Homogeneous
Fresh Response to Determine Gas Holdup in A Different Flow and/or Salinity Regime

| | Actual Gas Holdup | | | | | |
|---|---|---|---|---|---|---|
| | 0% | 20% | 40% | 60% | 80% | 100% |
| Laminated 0k Salinity | 0.00% | −4.30% | −1.17% | 0.43% | 1.93% | 0.00% |
| Laminated 125k Salinity | 6.05% | −0.40% | 3.02% | 2.29% | 1.86% | 0.00% |
| Laminated 250k Salinity | 11.47% | 3.60% | 6.43% | 5.47% | 2.54% | 0.00% |
| Homogeneous 125k Salinity | 6.05% | 2.07% | −0.13% | −0.32% | −1.43% | 0.00% |
| Homogeneous 250k Salinity | 11.47% | 4.68% | 0.67% | −1.02% | −2.61% | 0.00% |

TABLE 3

"Salinity Measurement" Gas Holdup Measurements

| | Actual Gas Holdup | | | | | |
|---|---|---|---|---|---|---|
| | 0% | 20% | 40% | 60% | 80% | 100% |
| Laminated 0k Salinity | 0.00% | 20.22% | 41.28% | 62.94% | 77.96% | 100.00% |
| Laminated 125k Salinity | 12.71% | 28.13% | 46.40% | 66.25% | 78.94% | 100.00% |
| Laminated 250k Salinity | 28.15% | 39.07% | 54.13% | 70.05% | 75.76% | 100.00% |
| Homogeneous 125k Salinity | 12.71% | 28.94% | 43.45% | 59.86% | 78.80% | 100.00% |
| Homogeneous 250k Salinity | 28.15% | 35.02% | 46.62% | 61.79% | 79.04% | 100.00% |

TABLE 4

Lamination "Measurement" Values

| | Actual Gas Holdup | | | | | |
|---|---|---|---|---|---|---|
| | 0% | 20% | 40% | 60% | 80% | 100% |
| Laminated 0k Salinity | 0.00% | −28.88% | −39.41% | −25.58% | −5.72% | 0.00% |
| Laminated 125k Salinity | 0.89% | −25.96% | −33.43% | −22.57% | −5.45% | 0.00% |
| Laminated 250k Salinity | −15.59% | −25.78% | −30.00% | −16.79% | −7.38% | 0.00% |
| Homogeneous 125k Salinity | 0.89% | 3.60% | 2.48% | 2.42% | −0.26% | 0.00% |
| Homogeneous 250k Salinity | −15.59% | 5.99% | 5.39% | 4.31% | −0.50% | 0.00% |

There are several things to be noted from Tables 1-4. First, it should be apparent that good choices for the salinity and lamination measurements were made. The salinity measurement is strongly affected by salinity, and the lamination measurement is strongly affected by lamination, and each is much less influenced by the other effect. This is a prerequisite for doing perturbation theory.

Second, it is noted that Table 2 gives the errors in the basic gas holdup measurement. It is obtained by simply subtracting the computed gas holdup from the actual gas holdup. For example, when the gas holdup is 20% and the fluid is homogenous 250 k ppm saline water, we see that the computed basic gas holdup measurement is 24.68%. Since we know that the actual gas holdup is 20%, the error is 4.68%, as is shown in Table 2.

Third, note that Table 4 is not really a gas holdup measurement. If the calculation of the values in Tables 1, 3 and 4 are examined, it is noted that the basic gas holdup measurement (show in Table 1) and the salinity measurement (shown in Table 3) are averages of two gas holdup measurements, thus they are both gas holdup measurements. But, the lamination measurement is the difference between two gas holdup measurements, so it is not a gas holdup measurement in itself. If Table 4 is examined, it is apparent that the measurement does increase with gas holdup, the values are maximized at medium gas holdup values, and zero at 100% gas holdup.

Fourth, it was mentioned above that the matrices were determined for a casing with an ID of 6.0 inches (15.2 centimeters). Similar tables have been developed for casing ID values of 3.0, 4.0, 5.0, and 7.0 inches (7.6, 10.2, 12.7. and 17.8 centimeters). It has been determined that the processes described in this disclosure work well for casing IDs in this range. If casings in the field with IDs <3 inches (7.6 centimeters) or >7 inches (17.8 centimeters), additional matrices of the types described above can be developed as required. If the actual casing ID in a field well were intermediate between any of these values, then linear interpolation would be used to estimate the elements of the required matrices for the specific casing in the well.

Fifth, it has been mentioned that the above matrices were determined for a two phase flowstream (gas and water). If the flowstream consisted of gas, oil, and water, the problem is more complicated, but still solvable if the relative proportion of oil and water can be estimated from surface production or other downhole production log data, and the density of the oil phase is known. This additional production logging data may be obtained from an appropriate sensor disposed in the auxiliary subsection 28 of the downhole assembly 20 shown in FIG. 1. For example, oil with a density of 0.8 gm/cc has identical properties in our gas holdup measurement to fresh water with 20% gas holdup. Therefore, a liquid component of the flowstream that is half oil and half fresh water will appear to have identical properties to a fresh water plus gas mixture having 10% gas holdup. In that situation, the matrices above would be rescaled such that 10% gas holdup would be rescaled to represent 0% gas holdup. If the water were saline in the three phase flow environment, the resulting liquid component salinity estimate would be too low, since oil has no appreciable salt content. In a situation where the liquid in the flowstream is assumed to be half oil and half water, and the actual water salinity is 150 k ppm, the estimated water salinity from our process would appear to be ~75 k ppm, since half of the liquid is oil (having 0 k ppm salinity). If the estimated liquid salinity is significantly different from ~75 k ppm in the situation where the actual water salinity is 150 k ppm, this might in turn indicate that the percentage of oil vs. water in the liquid phase differs from 50%. In fact, if the estimated liquid component salinity is sufficiently accurate, and the salinity of the water phase is known, then an estimate of the percentage water in the liquid could be directly obtained from the ratio of the estimated liquid component salinity to the known water salinity. If the water percentage of the flowstream is known, and the gas holdup (gas percentage) is determined, then the oil percentage in the flow stream would be 100% minus the sum of the water and gas percentages. It should be noted that this three component solution makes the implicit assumption that the fluid, if laminated, is not separated into three separate layers, but rather only two layers (gas and liquid). Since the density difference between oil or water and gas is much larger that the density difference between oil and water, to a first approximation, this should be a reasonable assumption.

Finally, it should be recalled that under field conditions, the tool does not "know" the actual gas holdup, the actual lamination, or the actual water salinity. At each depth in a well where the SGHT tool is used, the gas holdup, the degree of fluid lamination and the fluid salinity will be unknown. The measured count rates and ratios observed in a 6 inch (15.2 centimeter) ID casing in each detector will be initially input into response equations represented graphically in FIGS. 5-9, which assume that the liquid and gas are homogeneously distributed and the fluid has zero salinity. The outputs will be the apparent gas holdups A, B, C, D, E and F described above. The "basic gas holdup" measurement is then computed (an average of holdup estimates A and B, as described above). Since the basic gas holdup estimate minimizes overall errors caused by uncertainties in lamination and salinity, an initial estimate of gas holdup is obtained from the basic holdup measurement. This of course is not the actual gas holdup, but rather our first approximation to it, to be used in estimating fluid lamination and salinity.

Since the salinity holdup measurement is intentionally designed to give erroneous estimates of gas holdup in saline fluids, it is desirable to know how big an error in holdup might be anticipated if the liquid salinity were actually salt saturated 250 k ppm instead of 0 k ppm. To determine this, the basic gas holdup value computed above from field logging data, as an approximation to the actual gas holdup, is entered into the salinity effect matrix, assuming homogeneous distribution of the gas and liquid (Table 3, row 6). This initial assumption of homogeneity is not critical, since the salinity holdup measurement is also designed to have only a small dependence on the degree of fluid lamination. Therefore, if the liquid component of the flowstream had 250 k ppm salinity, an estimate of the anticipated gas holdup from the salinity measurement would be obtained from row six (bottom row) of Table 3. For example, if the basic holdup value computed from the field data were 20%, one would estimate the salinity measurement gas holdup with 250 k ppm salinity liquid in the casing to be 35.02%. For basic holdup values intermediate between two columns in Table 3, one would linearly interpolate to estimate the 250 k ppm salinity measurement gas holdup. The difference between the basic gas holdup value and the 250 k ppm salinity matrix derived gas holdup is called the "250 k salinity benchmark". Since the basic gas holdup estimate represents our best estimate to the actual gas holdup, the 250 k ppm salinity benchmark would represent, to a first approximation, the error in gas holdup if the fluid in the casing were salt saturated instead of 0 k ppm. A corresponding estimate of the "125 k ppm salinity benchmark" could be obtained via the same process using the basic holdup measurement entered into Table 3, row 5. The 125 k ppm salinity benchmark would represent an estimate to the error in computed gas holdup that might be expected if the fluid salinity were 125 k ppm instead of 0 k ppm.

Since estimates are now available for how far off the salinity measurement gas holdup would be if the liquid salinity in the flowstream were 125 k ppm and 250 k ppm instead of 0 k ppm, all that remains to be done is to compare these computed error estimates/benchmarks with an estimate of the salinity measurement holdup error actually measured by the tool. The salinity gas holdup measurement using tool data is given by the average of holdup estimates C and D, as described earlier. An estimate of the error in this holdup measurement can be obtained from the difference between this salinity measurement estimate of gas holdup and the basic gas holdup (which, as stated above, is the best estimate at this point to the actual gas holdup). This actual observed estimated gas holdup error (called the "net salinity measurement") is compared with the computed 125 k ppm and 250 k ppm benchmark errors obtained in the paragraph immediately above to obtain, via interpolation, a first estimate of the salinity of the liquid in the flowstream.

An exactly analogous process to that above described to obtain a flowstream liquid salinity estimate is conducted to determine the degree of lamination of the flowstream. This process uses the basic gas holdup measurement and the laminated fluid measurement matrix (Table 4, row 2) to compute an estimate of the lamination measurement benchmark, defined as the difference between gas holdups E and F in the lamination measurement if the flowstream were 100% laminated relative to zero lamination (homogeneous). Since the lamination measurement is only weakly related to salinity variations, the initial benchmark estimate is made assuming that the water has 0 k salinity. In a homogeneously distributed water with zero salinity, the quantity (holdup E-holdup F) is zero. The degree of lamination, to a first approximation, is directly proportional to the observed (E-F) difference. That is, the larger the degree of lamination, the larger the expected difference between E and F. Therefore, comparing the magnitude of the observed lamination measurement (E-F) difference with the computed 100% lamination measurement E-F difference (benchmark) produces an initial estimate to the degree of lamination of the flowstream.

Since the salinity measurement does have a small dependence on the degree of flowstream lamination, the lamination estimate just obtained can be used to improve the fluid salinity estimate. The salinity benchmark estimate will be recomputed, interpolating in the salinity measurement Table 3 between the salinity effects for 0% lamination and 100% lamination, with the interpolation based on the initial lamination estimate. Correspondingly, since the lamination measurement has a small dependence on the salinity of the fluid in the flowstream, the degree of flowstream lamination will also be re-estimated, using the initial salinity estimate to derive an improved estimate of the lamination benchmark.

These new estimated values of lamination and salinity will be used in Table 2 to provide an estimate of error in the basic gas holdup measurement. The error will be subtracted from the initial basic gas holdup measurement, resulting in a new improved estimate of the basic gas holdup. This improved basic gas holdup, together with the latest estimates of water salinity and degree of fluid lamination, is then used as the starting point for a second perturbation/iteration of the entire process to obtain yet better estimates of water salinity and degree of fluid lamination. Those better water salinity and fluid lamination estimates are then in turn used in a third iteration to provide an even better estimate of the basic gas holdup. The iteration process is repeated until terminated based on one or more pre-selected criteria. These criteria might include:

(a) a set maximum number of iterations, or
(b) when the difference between the successive estimates of basic gas holdup falls below some noise-based threshold value, or
(c) when the change in the estimated basic gas holdup estimate between iterations "n" and "n−1" is greater than the change between iterations "n−1" and "n−2", possibly indicating that the gas holdup determination process has stopped reducing errors, and may actually be beginning to diverge from the best estimate.

As discussed/described above, the process involved in making these calculations is somewhat complex. Thus, it is useful to consider a single example to show how the process works. Since all the logging estimates of gas holdup, salinity and lamination utilize the same process (although the number of iterations required may vary), a single example will be illustrative of how the process works in all cases. Finally, a discussion of perturbation theory as related to this computation process is disclosed in a subsequent section of this disclosure.

Processing of Measured Data

Figure 10:
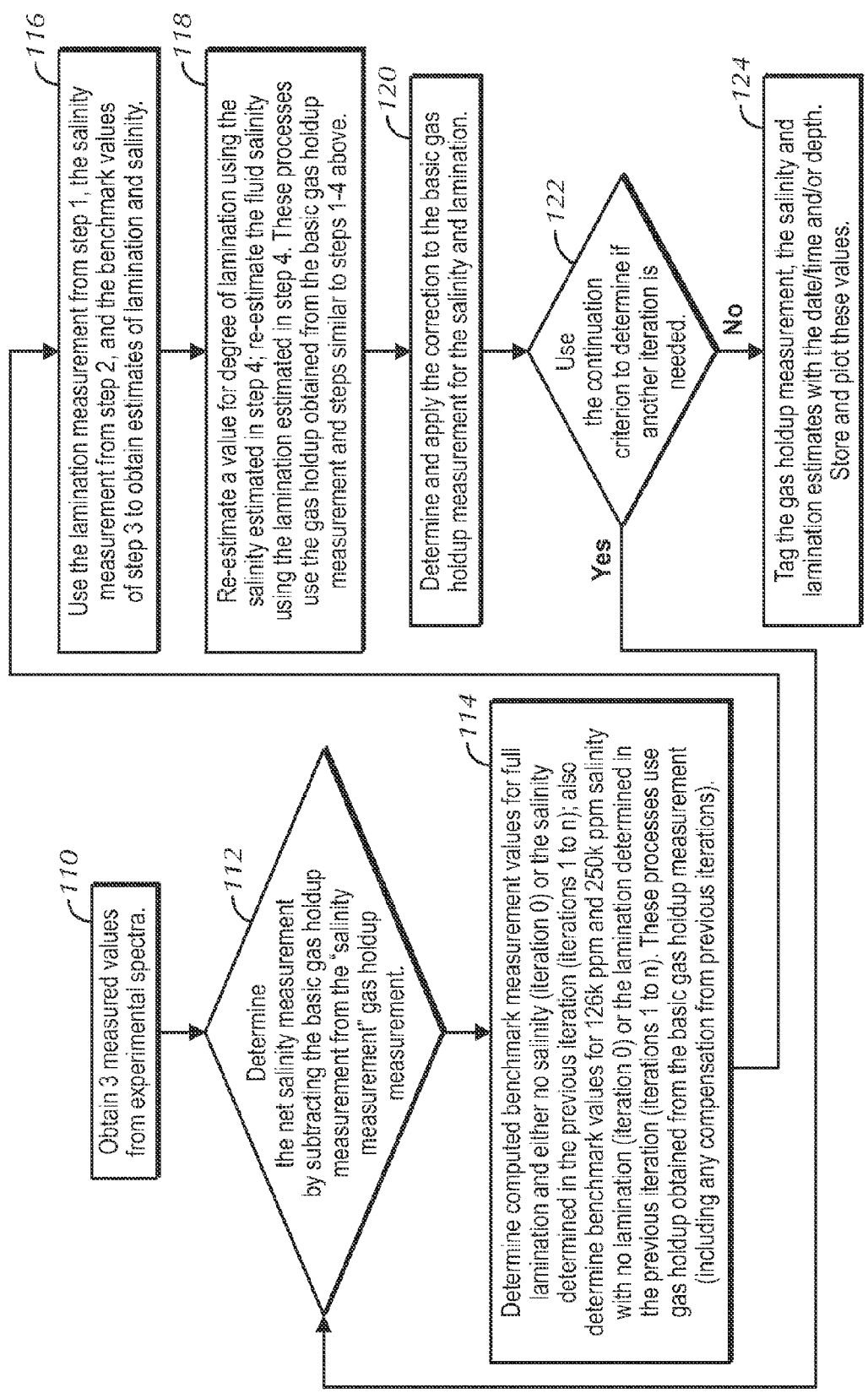
FIG. 10 is a flow chart of the gas holdup computation and computation of other parameters of interest.

FIG. 10 is a flow chart of the gas holdup computation and computation of other parameters of interest. Since the computation process involved is fairly complex, a detailed discussion of each of the eight steps in the process flowchart will then be presented for a specific example. The example is a flowstream in a 6 inch (15.2 centimeter) ID casing comprising a water/gas mixture composed of 45% gas and 55% water having 225 k ppm salinity, and with a fluid distribution that is 100% laminated.

Again referring to FIG. 10, Step 1 of the process is shown at 112. Count rates in energy regions of interest are obtained from gamma ray energy spectra (see FIG. 4) for the long and short spaced detector. These count rates are shown in Table 5.

TABLE 5

| 45% Gas Holdup, 225k ppm Salinity, Laminated Flow count rates and Ratios | | |
|---|---|---|
| | Short Spaced | Long Spaced |
| (1) Total cps | 47220 | 25255 |
| (2) E = 15 keV to 60 keV | 7245 | 3372 |
| (3) E > 60 keV cps | 39975 | 21882 |
| (4) E > 90 keV cps | 10527 | 9125 |
| (5) Ratio (2)/(3) | 0.1812 | 0.1541 |

The four short spaced detector count rates, four long spaced detector count rates and two ratios in Table 5 are entered into the appropriate response function curves shown in FIGS. 5-9, to determine estimated gas holdup values for each. Recall that the only measurements that are obtained from the response of tool in a field environment are the count rates and ratios shown in Table 5. At this point, the gas holdup, fluid salinity, and lamination are unknown quantities of interest. It would be tedious to go through the determination of all ten gas holdups, but one example is presented for brevity. The example chosen is the one that is used to calculate gas holdup "A", where A as defined earlier in the disclosure is the gas holdup measurement obtained by using the short spaced detector, utilizing count rate for E>90 keV in Table 5 (10,527 cps), entered into the homogenous response curve function for the short spaced detector shown in FIG. 8. Entering 10,527 as the measured count rate into the response function shown in FIG. 8 and using the corresponding short-spaced detector response curve shown at 94, one determines that the estimated gas holdup is approximately 57%. Alternately, a tabulation of values for points along the curve 94 in FIG. 8, such as those given in Table 6, can be used in a linear interpolation process to determine the gas holdup corresponding to the observed count rate (10,527 cps). From Table 6, we see that the estimated gas holdup will be between 40% and 60%.

TABLE 6

| SS Detector cps for E > 90 keV, Homogenous Fresh Flow | |
|---|---|
| Gas Holdup | cps |
| 0% | 15967 |
| 20.0% | 14472 |
| 40.0% | 12526 |
| 60.0% | 10194 |
| 80.0% | 7366 |
| 100.0% | 3826 |

Having determined this range we can now use interpolation (as shown in equation. (2)) to determine the gas holdup:

$$\text{Gas Holdup} = 40\% + 20\% * \frac{cps_{measured} - cps_{0\% \text{ Gas Holdup}}}{cps_{60\% \text{ Gas Holdup}} - cps_{40\% \text{ Gas Holdup}}} \quad (2)$$

Using equation (2) the estimated gas holdup is

40%+20%*(10527−12526)/(10194−12526)=40%+ 20%*(−1999/−2332)=40%+20%*0.857=57.14%

Hence gas holdup A=57.14%. Going through the same procedure to obtain estimated gas holdup B, yields B=45.60%.

Since the "basic gas holdup" measurement is defined as the average of A and B, it is determine that the initial basic gas holdup estimate to be 51.37%, which as discussed above, is then utilized in the determination of water salinity and degree of fluid lamination.

In a similar manner, as defined earlier, the salinity gas holdup measurement, (C+D)/2, and the lamination measurement (E−F) are calculated. These three estimated values are given in Table 7.

TABLE 7

Initial Measured Values for Determining Salinity and Lamination

| Measurement | Value |
|---|---|
| Basic Gas Holdup Measurement | 51.37% |
| Salinity Gas Holdup Measurement | 56.41% |
| Lamination Measurement | −25.98% |

Again referring to FIG. 10, Step 2, comprising determining the net salinity associated with the gas holdup measurement, is shown at 114. For the example used, the 0th order gas holdup measurement is the basic gas holdup measurement obtained from the tool and is 51.37% as given in Table 7. But, to estimate salinity and lamination, it is necessary to compare these observed salinity and lamination measurement values with "benchmarks", as described earlier, requiring additional calculations.

The salinity gas holdup measurement, since it is an average of two gas holdup measurements, is itself a gas holdup measurement. For this reason, it is useful to calculate a "net" salinity gas holdup effect using equation. (3). This is a first estimate as to how much the salinity holdup measurement differs from the actual gas holdup, which is being approximated by the basic gas holdup (the best estimate available at this point to the actual gas holdup).

$$\text{Net Salinity Effect} = \text{Salinity Gas } Holdup \text{ Measurement} - \text{Basic Gas } Holdup \text{ Measurement} \quad (3)$$
$$= 56.41\% - 51.37\%$$
$$= 5.04\%$$

Note that the lamination measurement (which is the difference between two gas holdup measurements) is not a gas holdup measurement. So, the basic gas holdup measurement is not subtracted in the process where lamination is being estimated.

Again referring to FIG. 10, Step 3 at 114 comprises the calculation of the salinity measurement benchmark for 125 k ppm salinity and 250 k ppm salinity water as well as the lamination measured benchmark for full lamination. Having determined the net salinity measurement, the next step is to establish benchmarks against which the observed net salinity and lamination measurements can be measured. Unlike the basic gas holdup measurement, the net salinity measurement is not a direct measurement of salinity, but rather an estimate of how much the salinity derived gas holdup differs from the actual gas holdup. Similarly the lamination measurement is not a direct measurement of the degree of gas-liquid lamination. Therefore, as discussed earlier, benchmarks are needed against which to compare the values obtained from equation (3) (net salinity measurement) and in Table 7 (lamination measurement). The salinity benchmarks that is chosen to use for the first iteration are estimations of how far from the actual gas holdup the expected gas holdups would be if the water salinity were 125 k ppm and 250 k ppm, assuming homogeneous fluid distribution (degree of lamination is of only secondary significance in the salinity holdup measurement). Note that after the initial iteration, we will determine 125 k ppm and 250 k ppm salinity benchmarks utilizing the degree of lamination estimated in the previous iteration).

In developing a lamination benchmark, it is necessary to determine how much the lamination measurement estimate (holdup E minus holdup F), assuming 100% laminated fluids, differs from the lamination measurement in a homogeneous fluid distribution (where E-F is assumed to be approximately zero). The initial lamination benchmark is chosen to be 100% laminated flow, and an assumed a water salinity of 0 k ppm. As discussed earlier, the initial assumed salinity value is not critical, since water salinity is of only secondary importance in the lamination measurement. After the first iteration, the salinity estimated is utilized in the previous iteration to develop an improved lamination benchmark. Further discussion of these techniques presented in a subsequent section of this disclosure that discloses the iteration process in detail.

In order to make these benchmark estimates, reference is made to Tables 3 and 4 which give salinity holdup and lamination measurement values computed for 0%, 20%, 40%, 60%, 80%, and 100% gas holdup. Obviously, most of the time these Tables are not entered with basic gas holdup estimates that are exact multiples of 20%. Thus a linear interpolation is necessary to obtain the benchmarks.

The 45% gas holdup, 225 k ppm salinity and full lamination are continued to be used as an example of data processing. The actual lamination and salinity are not utilized in this section, because they are not known a priori. Neither is the actual gas holdup of 45% known a priori. What has been determined at this point is the basic gas holdup measurement of 51.37%, which is the best approximation at this point to the actual gas holdup.

Rows 5 and 6 in Table 3, together with basic gas holdup value (51.37%), are used as an approximation to the actual gas holdup, to determine estimates of expected salinity gas holdup that would be obtained with 125 k ppm salinity and with 250 k ppm salinity. Correspondingly, row 2 from Table 4 is used to determine the lamination measurement obtained with laminated fresh flow.

To obtain these salinity (or lamination) holdup estimates, a linear interpolation is used between the values for 40% and 60% gas holdup to obtain the value for 51.37% gas holdup, as given in equation (4).

$$M = (X + (Y-X) \times (Z-40\%))/20\% \quad (4)$$

where

X is the measurement made with the lamination or salinity measurement at 40%;

Y is the measurement made with the lamination or salinity measurement at 60%;

Z is the basic gas holdup measurement (51.37% in the example); and

M is the measurement used to determine the lamination or salinity effect benchmark.

To determine the net salinity effect for 125 k ppm and 250 k ppm water salinity, the following steps are necessary. For 125 k ppm, Table 3 shows, X=43.45%, and Y=59.86%. It has already been established that Z is 51.37%; giving Z−40% as 11.37%. This yields:

$$M = 43.45\% + (59.86\% - 43.45\%) \times (11.37\%/20\%) \quad (5)$$

$$= 43.45\% + 16.41\% \times 0.569 = 52.78\%$$

For 250 k ppm, X=46.62%, Y=61.79%, Z−40=11.37%.

$$M = 46.62\% + (61.79\% - 46.62\%) \times (11.37\%/20\%) \quad (6)$$

$$= 46.62\% + 15.17\% \times 0.569 = 55.25\%$$

These values (52.78% and 55.24%) represent the estimated gas holdup values that the salinity measurement would compute if the water salinity were 125 k ppm and 250 k ppm, respectively, instead of fresh water. As in Step 2 at 112, bench marks are needed for how much difference (error) there is between these estimated gas holdups and the actual gas holdups (as approximated by the basic gas holdup measurement).

125 k ppm net salinity effect (125 k benchmark)=
52.78%−51.37%=1.41%

250 k ppm net salinity effect (250 k benchmark)=
55.24%−51.37%=3.87%

To correspondingly determine the net lamination effect benchmark for 100% lamination:
For fresh laminated flow, X=−39.41%, Y=−25.85%, Z−40=11.37% and $$M = -39.41\% + (-25.58\% - -39.41\%) \times (11.34\%/20\%) \quad (7)$$

$$= -39.41\% + 13.83\% \times 0.569 = -31.55\%$$

The lamination measurement, since it is not a gas holdup measurement, does not need to have the basic gas holdup measurement subtracted from it (as was necessary for the salinity measurement) to obtain the benchmark value. The lamination benchmark is obtained directly from equation (7). These initial salinity and lamination benchmarks are given in Table 8 for the case being considered in this example.

TABLE 8

Benchmark Measurements

| Measurement | Value |
|---|---|
| 125k ppm Salinity Effect Benchmark | 1.41% |
| 250k ppm Salinity Effect Benchmark | 3.88% |
| 100% Lamination Effect Benchmark | −31.55% |

Again referring to FIG. 10, Step 4 is the initial estimation of salinity and lamination is shown at 116. The initial calculation of lamination is extremely straightforward. The lamination effect measurement (the difference between gas holdup estimate E and holdup estimate F) is determined to get progressively larger as the degree of lamination diverges away from a homogeneous fluid distribution, where the lamination effect is zero. Therefore an initial estimate of the degree (percentage) of fluid lamination would be to compare the magnitude of the observed (E−F) value with the (E−F) value for the 100% laminated flow benchmark. It is given in equation. (7a):

Degree of lamination=(observed lamination effect)/
(100% lamination effect benchmark) (7a)

Using the observed and benchmark lamination values from Tables 7 and 8 respectively, yields:

Degree of lamination=−25.98%/−31.55=82.4 (8)

The calculation of estimated fluid salinity is a bit more complex since there are benchmark values at both 125 k ppm and 250 k ppm salinity. If the observed value for the net salinity effect is less than the value for 125 k ppm salinity benchmark, then it is assumed that the salinity is below 125 k ppm. If the observed/measured net salinity effect is greater than the value for the 125 k ppm benchmark, then it is assumed to be between 125 k ppm and 250 k ppm benchmarks. This leads to the following algorithm.

(a) If the measured Salinity Effect<125 k ppm salinity benchmark, then, assuming a linear response between 0 k and 125 k salinity, the initial fluid salinity is estimated as:

Salinity=125 k ppm*(measured salinity effect)/(125 k
ppm salinity benchmark) (9)

(b) If the measured Salinity Effect>125 k ppm salinity benchmark, then, assuming a linear response between 125 k and 250 k salinity, the initial fluid salinity is interpolated as:

$$\text{Salinity} = 125 \text{ k } ppm * \left(1 + \frac{(\text{Measured Salinity Effect} - 125 \text{ k benchmark})}{(250 \text{ k benchmark} - 125 \text{ k benchmark})}\right) \quad (10)$$

Combining the results of equation (3) and Table 8 yields the values in Table 9

TABLE 9

Measured and 125k ppm Salinity Effects

| Salinity Effects | Value |
|---|---|
| 125k ppm Salinity Effect Benchmark | 1.44% |
| Measured Salinity Effect | 5.04% |

So, the measured value is well above the 125 k ppm value. This yields:

Salinity = 125 k *ppm* * (1 + (5.04% − 1.44%)/(3.88% − 1.44%)) (11)

= 125 k *ppm* * (1 + 3.60%/1.44%) (11a)

= 437.5 k *ppm* (11b)

This is outside the typical physical range for salinity (0 k ppm to 250 k ppm), so it is reset to the maximum physical value: 250 k ppm. It is found that, when the salinity effects are small and the lamination effects are large, it is difficult to obtain accurate initial estimates of salinity. Further, since the salinity effects are small, the maximum error in salinity must also be small. Thus, we will not be concerned with the high value of salinity and accept the first estimates of salinity and lamination given in Table 10.

TABLE 10

Salinity and Lamination

| Salinity | 250k ppm |
|---|---|
| Lamination | 82.4% |

Once again referring to FIG. 10, Step 5 at 118 comprises the calculation of a revised estimation of salinity and lamination. Examining Table 3, it is apparent that, especially at higher gas holdups, the salinity response becomes somewhat more dependent on the degree of lamination. Correspondingly, at near zero gas holdup, the lamination measurement in Table 4 becomes significantly influenced by fluid salinity. Based on these observations, the fluid salinity is re-estimated using the actual estimated degree of lamination derived in Step 4 above (rather than the initial assumption of zero lamination). Correspondingly, the degree of lamination will be re-estimated using the improved estimate of fluid salinity. To accomplish this, linear interpolation methods are used. This will be fairly complex, because the process requires "layered" linear interpolations, as described below. But the basic principles are similar to those underlying the work in Steps 3 and 4 above.

With the fluid salinity estimate of 250 k ppm (Table 10), the lamination effect benchmark are recomputed. Even though there just happens to be a row in Table 4 that correlates to a salinity of 250 k ppm, interpolation between rows will be shown for the sake of completeness. For salinity, there are three values where benchmarks are determined for which no salinity interpolation is needed. These are 0 k ppm, 125 k ppm, and 250 k ppm. For lamination, there are two such values, namely 0% and 100%. The odds are extremely low for a computed salinity or lamination estimate to exactly match the value at which a benchmark is calculated, 125 k ppm salinity for example. However, when a computed value is above or below a physical limit (boundary) value, which is not uncommon, it is reset to exactly the boundary value it exceeded. The boundary values are 0% and 100% gas holdup; 0% and 100% lamination; and 0 k ppm and 250 k ppm salinity, all of which are points where benchmarks are determined. This is the situation in the selected computation example. Therefore, with the first salinity estimate reset to 250 k ppm from 437.5 k ppm, a salinity is found that coincides exactly with a salinity where a benchmark is determined. But, since the interpolation still works at benchmark salinities, 250 k ppm can still be used as an example for interpolation. To do this, row 3 (125 k ppm saline laminated flow) and row 4 (250 k ppm saline laminated flow) are used in the Table to obtain the response for 100% lamination and 250 k ppm salinity. Correspondingly, interpolation is still needed between row 5 (125 k ppm saline homogenous flow) and row 6 (250 k ppm saline homogeneous flow) in Table 4 to obtain the response for homogeneous flow and 250 k ppm salinity. Using the new data corresponding to a salinity of 250 k ppm, two new benchmarks are developed in order to re-estimate the degree of fluid lamination.

Having defined the process, this re-estimated degree of flowstream lamination determination is presented for the selected computational example. Later in this section the process for recalculating salinity will be presented. Since the basic gas holdup value (51.37%) to be entered into Table 4 is between 40% and 60%, only the elements of the "new 250 k rows" at 40% and 60% need to be reused for the interpolation process. Therefore, the analysis will be limited to interpolation to the range between the 40% and 60% gas holdup values, and not show all of the arithmetic.

The 40% and 60% columns in Table 11 are taken directly from the corresponding columns in Table 4, and the 51.37% column has been determined by linear interpolation between the data in the 40% and 60% columns. The data in the 51.37% column represents what would be the anticipated lamination measurement (holdup E-holdup F) values would be at an actual gas holdup of 51.37%. But it has just determined that the water salinity is estimated to be 250 k ppm. Therefore there is a need to perform a second set of interpolations to estimate what to expect for the lamination measurement values for a gas holdup of 51.7%, if the salinity were actually 250 k ppm.

TABLE 11

Lamination Measurement Table Values at the basic gas holdup

| Gas Holdup | 40% | 60% | 51.37% |
|---|---|---|---|
| Laminated 0k Salinity | −39.41% | −25.58% | −31.55% |
| Laminated 125k Salinity | −33.43% | −22.57% | −27.26% |
| Laminated 250k Salinity | −30.00% | −16.79% | −22.49% |
| Homogeneous 125k Salinity | 2.48% | 2.42% | 2.45% |
| Homogeneous 250k Salinity | 5.39% | 4.31% | 4.78% |

Using the values from the last column in Table 11 and the 250 k ppm salinity, compute homogeneous and full lamination are computed for measurement Table values as:

$$\text{Laminated 250 k Salinity} = -27.26\% + (-22.49\% - -27.26\%) \times \quad (12)$$
$$(250 - 125)/(250 - 125)$$
$$= -27.26\% + 4.77\% \times 10$$
$$= -22.49$$

$$\text{Homogeneous 250 k Salinity} = 2.45\% + (4.78\% - 2.45\%) \times \quad (13)$$
$$(250 - 125)/(250 - 125)$$
$$= 2.45\% + 2.33\% \times 1.$$
$$= 4.78$$

The new lamination measurement benchmark is the lamination measurement difference that one would expect to obtain at 250 k ppm salinity between a 100% laminated flowstream and a 0% laminated (i.e., a 100% homogeneously distributed) flowstream:

New lamination measurement benchmark=(−22.49%−4.78%)=−27.27%

To determine an improved new estimate degree of flowstream lamination equation (14) is used, which compares the difference in the actual observed lamination measurement for our example (from Table 7) and the lamination measurement value expected for 0% lamination, relative to the maximum expected difference (the lamination benchmark). The proportionality defines the new estimate of lamination (the degree of lamination):

$$\text{Lamination} = (Lamination_{measured} - Lamination_{0\% \, Response}) / \quad (14)$$
$$\text{Lamination benchmark}$$
$$= (-25.98 - 4.78)/-27.27$$
$$= -30.76/-27.27$$
$$= 113\% \quad (14a)$$

As with the earlier salinity example, this is non-physical. So, the upper out of bounds value is reset to 100%.

$$\text{Lamination} = 100\% \quad (14b)$$

An analogous procedure is utilized to determine an improved estimate of the liquid salinity in the flowstream. It is started by linearly interpolating in Table 3 between 40% gas holdup and 60% gas holdup to obtain salinity measurement tabular values for 11.34% gas holdup, as shown in Table 12.

TABLE 12

Salinity Measurement Gas Holdup Values

| Gas Holdup | 40% | 60.00% | 51.37% |
|---|---|---|---|
| Laminated 0k Salinity | 41.28% | 62.94% | 53.59% |
| Laminated 125k Salinity | 46.40% | 66.25% | 57.68% |
| Laminated 250k Salinity | 54.13% | 70.05% | 63.18% |
| Homogeneous 125k Salinity | 43.45% | 59.86% | 52.78% |
| Homogeneous 250k Salinity | 46.62% | 61.79% | 55.24% |

By definition, any computed salinity measurement gas holdup value in a homogeneous flowstream with 0 k ppm salinity liquid is exactly equal the actual gas holdup. Using this fact and the values from the last column in Table 12 and the 82.4% estimated degree of lamination determined in the first lamination computation (Table 10), the expected value of the salinity gas holdup measurement at 0 k salinity is computed:

$$0 \text{ k } ppm \text{ Salinity Gas } Holdup = 51.37\% + (53.59\% - 51.37\%) \times \quad (15)$$

$$\text{lamination}$$

$$= 51.37\% + 2.22\% \times 0.825$$

$$= 53.18\% \quad (15a)$$

From data in Table 12, column 3, lines 3 and 5, one can interpolate to obtain an expected value for the 125 k salinity measurement gas holdup value if the degree of lamination is 82.4%:

$$125 \text{ k } ppm \text{ Salinity Gas } Holdup = 52.78\% + (57.68\% - 52.78\%) \times \quad (16)$$

$$(\text{lamination})$$

$$= 52.78\% + (4.91\%) \times 0.824$$

$$= 52.82\% \quad (16a)$$

Similarly, one can interpolate to obtain an expected value for the 250 k ppm salinity measurement gas holdup value if the degree of lamination is 54.6%:

$$250 \text{ k } ppm \text{ Salinity Gas } Holdup = 55.24\% + (63.18\% - 55.24\%) \times \quad (17)$$

$$(\text{lamination})$$

$$= 55.24\% + 7.94\% \times 0.824$$

$$= 61.78\% \quad (17a)$$

The gas holdups in equations. (15a), (16a), and (17a) are the expected gas holdups that would be observed with the salinity measurement with the basic gas holdup at 51.37% and a degree of lamination of 82.4%. From these must be developed the 0 k, 125 k and 250 k salinity benchmarks, which are defined as the differences between these numbers and the observed basic gas holdup value, 51.37%. This is shown in Table 13:

TABLE 13

Salinity Table Benchmark Gas Holdup Values

|  | Gross Value | Benchmark Value |
|---|---|---|
| 0k ppm Salinity | 53.18% | 1.83% |
| 125k ppm Salinity | 56.82% | 5.45% |
| 250k ppm Salinity | 61.78% | 10.41% |

To obtain an improved estimate of water salinity, it is necessary to compare observed net salinity effect determined in Step 2 with the salinity benchmark values in Table 13. Since the observed net salinity effect, 5.04%, falls between the 0k and 125 k benchmark values in Table 13, we must interpolate to get the revised salinity estimate. Since the net observed salinity effect falls below the value for 125 k, interpolation between 0 k ppm and 125 k ppm benchmarks is employed. If the observed value are greater than the 125 k benchmark, interpolation between 125 k and 250 k ppm benchmarks would be employed.

$$\text{Salinity} = 125 \text{ k } ppm * \frac{\left(\begin{array}{c}\text{MeasuredSalinity Effect} - \\ \text{Salinity Benchmark for } 0 \text{ k } ppm\end{array}\right)}{\left(\begin{array}{c}\text{Salinity Benchmark for } 125 \text{ k } ppm - \\ \text{Salinitybenchmark for } 0 \text{ k } ppm\end{array}\right)} \quad (18)$$

$$= 125 \text{ k } ppm \times (5.04\% - 1.83\%) / (5.45 - 1.83) \quad (18a)$$

$$= 125 \text{ k } ppm \times 3.21\% / 3.62\%$$

$$= 110.8 \text{ k } ppm \quad (18b)$$

The water salinity and degree of lamination estimates obtained in this step of the flow chart (Step 5) and in the previous Step 4 are shown in Table 14. The latest (Step 5) salinity and lamination estimates are used in Step 6 to develop a correction to the basic gas holdup measurement. This correction is then applied to the initial basic gas holdup estimate to obtain an improved/corrected estimated basic gas holdup. This improved basic gas holdup measurement is then used as the input to a second identical iteration process to develop even better estimates of gas holdup, fluid salinity and degree of fluid lamination.

TABLE 14

Salinity and Lamination Estimates

|  | Step 4 | Step 5 |
|---|---|---|
| Salinity | 250k ppm | 110.8k ppm |
| Lamination | 82.4% | 100.0% |

Once again referring to FIG. 10, Step 6 shown at 120 involves determining and applying corrections to the basic gas holdup measurement. Having determined estimates of the degree of lamination and the liquid component salinity in the flowstream, the final process in the first complete iteration is a re-estimation of basic gas holdup. This is accomplished using the salinity and lamination estimates as inputs to the basic gas holdup response error matrix (as shown in Table 2) to obtain corrections to be applied to the initial basic gas holdup estimate. To determine this correction, it is necessary to estimate the errors in the initial 51.37% basic gas holdup estimate. These errors are determined by interpolating between the basic gas holdup errors for 40% and 60% in Table 2, assuming the current estimate of basic gas holdup (51.37%), as shown in Table 15. The values in 51.37% column have been linearly interpolated between the values in the 40% and 60% columns. As in Step 5, we will need to perform a layered interpolation process to estimate the error in the basic gas holdup.

TABLE 15

Basic Gas Holdup Error Matrix (40% & 60% from Table 2 & 51.37% interpolated)

| Holdup | 40% | 60% | 51.37% |
|---|---|---|---|
| Laminated 0k Salinity | −1.17% | 0.43% | −0.26% |
| Laminated 125k Salinity | 3.02% | 2.29% | 2.60% |
| Laminated 250k Salinity | 6.43% | 5.47% | 5.88% |
| Homogeneous 125k Salinity | −0.13% | −0.32% | −0.24% |
| Homogeneous 250k Salinity | 0.67% | −1.02% | −0.29% |

In order to use Table 15 to determine the gas holdup error, the same double layer technique will be used as was used in Step 5. First, the estimate of fluid salinity (110.8 k ppm) is utilized to determine from Step 5, and shown in Table 14, to determine an initial estimate of the error in the basic holdup measurement due to salinity, assuming zero lamination. An estimate of salinity error is then used assuming 100% flowstream lamination. And finally, since there is an estimate of the degree of lamination (Step 5, Table 14), interpolation between the 0% lamination and 100% lamination salinity errors can be used to determine an overall estimate of the error in the basic gas holdup measurement.

In this initial step, it is assume that the flowstream is homogeneously distributed (the lamination contribution to the correction will be estimated after the salinity error is estimated). The initial basic gas holdup value (51.37%) is entered into Table 15 since the estimated salinity is 110.8 k ppm. Values will be interpolated between the 0 k ppm and 125 k ppm values in the bottom two rows in Table 15:

$$\text{Salinity error (assuming no lamination)} = 0\%^1 + (-0.24\%) \times \quad (19)$$
$$110.8/(125-0)$$
$$= 0\% - 0.24\% \times 0.886 -$$
$$0.21\% \quad (19a)$$

[1]recall that, by definition,
there is no correction for 0 k *ppm* salinity flow.

Similarly, one can compute an estimate of the salinity error assuming 100% flowstream lamination by interpolating using data in rows 3 and 4 of Table 15, again assuming the basic gas holdup value of 5%:

$$\text{Salinity error (assuming 100\% Lamination)} = -0.26\% + \quad (20)$$
$$(2.60\% - 0.26\%) \times$$
$$110.8/(125\% - 0\%)$$
$$= -0.26\% + 2.86\% \times 0.886$$
$$= 2.28\% \quad (20a)$$

Using the latest estimate of the degree of lamination from Table 14 (100%), we can estimate the salinity error with 100% flowstream lamination, by assuming that the salinity error varies linearly between the value (0.21%) for zero lamination and the value (2.28%) for 100% lamination. Since in this example the estimated lamination percentage is 100% in this iteration, equation (21) can be used to obtain the estimated error in the basic gas holdup measurement.

$$\text{Total error in basic gas } holdup = \text{Salinity error (100\% lamination)} \quad (21)$$
$$= 0.21\% \times 0 + (2.28\%) \times 1$$
$$= 2.28\%$$

The gas holdup correction is the opposite of the gas holdup error. Therefore the re-estimated (compensated) basic gas holdup value is given by:

$$\text{Re-estimated Basic Gas } Holdup = \text{Initial Basic Gas } Holdup - \quad (22)$$
$$\text{Basic Gas } Holdup \text{ error}$$
$$= 51.37\% - 2.28\%$$
$$= 49.09\% \quad (22a)$$

This concludes the first iteration to determine estimates of liquid component salinity and degree of flowstream lamination, and an improved estimate of basic gas holdup. The new basic gas holdup estimate is used to replace the initial basic gas holdup estimate in Table 7, and the next full iteration/perturbation begins with the new estimated values of basic gas holdup (49.09%), liquid salinity (110.8 k ppm), and degree of lamination 100%). As stated previously, the iteration process is used to optimizing the accuracy and precision of the three flow stream parametric measurements. The iteration process is continued until it is stopped at Step 7 shown at 122 of FIG. 10. For the purposes of illustration, 10 perturbations/iterations are presented. This is in excess of what would be expect to actually run in downhole field conditions, but it is useful in seeing:
1) how stable the processing technique is;
2) how the values settle down after only a few perturbations; and
3) how the changes in gas holdup are minimal after only three perturbations, while noticeable changes in salinity exists until about the 6th iteration. The great sensitivity of the salinity measurement for gas holdups >40% is due to the small salinity effect at these gas holdups. As a practical matter, we would likely have stopped the perturbations after the third iteration.

The gas holdup, estimated lamination, and the estimated salinity are shown in Table 16. The errors in these values are shown in Table 17. The errors are obtained by subtracting the input initial conditions of 45% gas holdup, 100% lamination, and 225 k ppm salinity. It is worth noting that gas holdups with typical errors in the range of 1-2% using this technique are much better than gas holdups provided by prior art one detector systems (where errors can be up to 10%-15%). Furthermore, prior art techniques provide no estimates of degree of flowstream lamination or the salinity of the flowstream liquid, whereas fairly good estimates can be obtained using the method of the present invention.

TABLE 16

Gas Holdup, Lamination, and Salinity Estimates (as a function of the number of iterations/perturbations)

| Iteration | Gas Holdup % | Lamination % | Salinity kppm |
|---|---|---|---|
| 0 | 51.37% | 0.0% | 0.0 |
| 1 | 49.09% | 100.0% | 110.8 |
| 2 | 47.84% | 100.0% | 156.7 |
| 3 | 47.24% | 100.0% | 177.7 |
| 4 | 46.95% | 100.0% | 187.5 |
| 5 | 46.82% | 100.0% | 192.0 |
| 6 | 46.76% | 100.0% | 194.1 |
| 7 | 46.73% | 100.0% | 195.0 |
| 8 | 46.72% | 100.0% | 195.4 |
| 9 | 46.71% | 100.0% | 195.6 |
| 10 | 46.71% | 100.0% | 195.7 |

TABLE 17

Errors in Gas Holdup, Lamination, and Salinity Estimates (as a function of the number of iterations/perturbations)

| Iteration | Gas Holdup Error | Lamination Error | Salinity Error (kppm NaCl) |
|---|---|---|---|
| 0 | 6.37% | −100.0% | −225.0 |
| 1 | 4.09% | 0.0% | −114.2 |
| 2 | 2.84% | 0.0% | −68.3 |
| 3 | 2.24% | 0.0% | −47.3 |
| 4 | 1.95% | 0.0% | −37.5 |
| 5 | 1.82% | 0.0% | −33.0 |
| 6 | 1.76% | 0.0% | −31.0 |
| 7 | 1.73% | 0.0% | −30.0 |
| 8 | 1.72% | 0.0% | −29.6 |
| 9 | 1.71% | 0.0% | −29.4 |
| 10 | 1.71% | 0.0% | −29.3 |

At Step 7 shown at 122 of FIG. 10, it is determined if another iteration is needed to meet the one or more iteration criteria presented below. If the termination criteria are not met, the processing returns to Step 2 at 112 and Steps 2-6 are repeated to further and further refine estimates of gas holdup, liquid flowstream salinity, and the degree of flowstream lamination. If these predetermined termination criteria are met, the process has yielded final estimates of gas holdup, salinity, and degree of lamination. Possible termination criteria are:

(a) a predetermined maximum number of iterations; or
(b) when the difference between the successive estimates of basic gas holdup falls below some noise-based threshold value; or
(c) when the change in the estimated basic gas holdup estimate between iterations n and n−1 is greater than the change between iterations n−1 and n−2, possibly indicating that the gas holdup determination process has stopped reducing errors, and may actually be beginning to diverge from the best estimate.

Step 7 basically determines, based on one or more of these criteria, whether or not an additional iteration is required. If so, the process loops back to Step 2 and another iteration is initiated. If not, the computation goes to Step 8 shown at 124. Step 8 outputs the gas holdup, salinity, and lamination results (as a function of the depth in the well where the measurements were made) to a log or, together with the observed spectral data in the two detectors, to a data storage device. The output logs (and/or the measured spectra) may be filtered/averaged to reduce statistical fluctuations in the results.

In a field logging situation, changes in flowstream regime rarely occur quickly, and when they do, it is often where there are changes in casing ID that cause the changes in flowstream regime. Fluid salinity and/or lamination generally do not vary significantly in a given casing size from one depth in the well where computations are made to the next depth (normally computations are made at 3 to 6 inch (7.6 to 15.2 centimeter) intervals. Therefore, in part in order to reduce the number of iterations required, the salinity and lamination values from one depth interval can, as an option, be used as the input values to the initial iteration in the subsequent depth interval.

The Application of Perturbation Theory

As described in previous sections, the present invention determines three unknown parameters of interest from three measured and processed tool parameters. The unknown parameters of interest are basic gas holdup measurement, the salinity measurement, and the degree of lamination measurement. Dependent on the nature of the tool measurements, there are a number of ways to solve three equations in three unknowns. One way is perturbation theory. To understand how it works, consider a simple example.

$$A = f(x, y, z)$$

$$B = g(x, y, z)$$

$$C = h(x, y, z)$$

Perturbation theory can be used if A is strongly dependant on x and weakly dependant on y and z, B is strongly dependant on y and weakly dependant on x and z, and C is strongly dependant on z and weakly dependant on x and y. Perturbation theory can be used in the case where, for example, B is strongly dependent on x and y and weakly dependant on z and we know A to within acceptable errors. Acceptable errors are defined as errors small enough so that B is weakly dependant on the errors in x. Finally, it is recognized that strongly and weakly are qualitative, not quantitative statements. Perturbation theory works as long as each time one goes through the loop, one is coming closer to the correct answer. A simple example of this is the set of equations:

$$A = x + 0.1*y \quad (23)$$

$$B = 0.1*x + y. \quad (24)$$

If A=1 and B=2, the process is started by assuming that y is 0 in equation (23) and x is zero in (24). These assumptions yield x=1 and y=2. This is the 0th order perturbation. For the first order, we insert the value for y we just obtained into equation (23) and the value for X in equation (24) and obtain:

$$1 = x + 0.2; x = 0.8$$

$$2 = 0.1 + y; y = 1.9$$

These are the first order values. For the second order values, the respective first order values are used in equations (23) and (24) to obtain:

$$1 = x + 0.19; x = 0.81$$

$$2 = 0.08 + y; y = 1.92$$

Continuing this process approaches the actual values for x and y.

Now, one may point out that there are better ways of solving these two equations in two unknowns than perturbation theory. That would be correct. However, the method of solution will be used in a more complicated case, where the functions are not the simple linear functions shown in equations (23) and (24). Indeed, they are sufficiently complicated to not be used in this disclosure. Instead, a set of three linear equations in three unknowns will be used that share some of the relationships between the variables exhibited in the disclosed gas holdup measurement, so it can be seen how the perturbation process can work with three variables.

Consider the following equations $$A = 1.0*x + 0.1*y - 0.05*z \quad (25)$$

$$B = 1.0*x + 1.0*y + 0.1*z \quad (26)$$

$$C = 0.8*x + 0.1*y + 1.8*z \quad (27)$$

Assume that A=0.5, B=0.8 and C=1. Since it is known that B and C are strongly dependent on x, x will be assumed to be non-zero. Equation (25) will be solved, assuming y and z are zero and then use this value obtained for x in (26) and (27). This yields:

$$0.5 = 1.0*x; x = 0.5$$

Inserting this value in equations (25) and (26), we have $$0.8 = 0.5 + y; y = 0.3$$

and $$1 = 0.8*0.5 + 1.8*z; 0.6 = 1.8*z; z = 0.333$$

These are the $0^{th}$ order values. Going through the same process, starting with calculating A first, yields $$0.5 = 1.0*x + 0.1*0.3 - 0.05*0.333;$$

$$x = 0.5 - 0.03 + 0.01665; x = 0.487$$

$$0.8 = 0.487 + y + 0.1*0.333; y = 0.8 - 0.487 - 0.0333;\\y = 0.280$$

$$1 = 0.8*0.487 + 0.1*0.3 + 1.8*z; z = 0.58/1.8; z = 0.322$$

These are the first order values. One more perturbation yields $$0.5 = 1.0*x + 0.1*0.28 - 0.05*0.322; x = 0.5 - 0.028 +\\0.0161; x = 0.488$$

$$0.8 = 0.488 + y + 0.1*0.322; y = 0.8 - 0.488 - 0.032; y = 0.280$$

$$1 = 0.8*0.488 + 0.1*0.280 + 1.8*z; z/1.8 = 1 - 0.390 -\\0.029 = 0.581/1.8; z = 0.323$$

These are the second order values. It can be seen that two of the values changed by only 0.001 and one had such a small change that the number was the same to three significant digits. This would be a reasonable place to stop the perturbation.

Now, one might ask if it is possible for perturbation to diverge instead of converge. That is possible. That is why reasonable perturbation routines have a check to ensure that every change in value is smaller than the last change. If, for example, abs(xn−xn−1)>abs (xn−1−xn−2) where "n" is the perturbation number, then we know that the technique has begun to fail. In this case we revert back to x=xn−1 and stop the process.

SUMMARY

In this patent application, all aspects of a new spectral gas holdup tool (SGHT) technology have been disclosed, and how the SGHT can be used to obtain significantly improved measurements of gas holdup relative to prior art systems. The basic methodology utilizes spectral data from two gamma ray detectors at different spacings from a nuclear source that emits gamma radiation. 57Co is the preferred source. In addition to a full bore gas holdup measurement, the SGHT also provides estimates of the degree of flowstream lamination and the salinity of the liquid in the flowstream, neither of which is available in prior art systems. The process has been disclosed in great detail using one illustrative example, showing how the perturbation-based iterative technique can be used to obtain very accurate answers to the flow stream parameters of interest.

The above discussion is to be regarded as illustrative and not restrictive, and the invention is limited only by the claims that follow.

The invention claimed is:

1. A downhole tool for measuring gas holdup in a borehole flowstream, the tool comprising:
   (a) a low energy gamma radiation source that emits gamma radiation in a range between 75 kiloelectron Volts (keV) and 150 keV;
   (b) a long spaced gamma ray detector adapted to detect gamma rays scattered from interactions between the emitted gamma radiation and the borehole flowstream;
   (c) a short spaced gamma ray detector adapted to detect gamma rays scattered from interactions between the emitted gamma radiation and the borehole flowstream; wherein
   (d) count rate data of the short spaced detector and the long spaced detector to gamma rays scattered from the emitted gamma radiation in a plurality of predetermined gamma radiation energy regions are combined to yield the measure of gas holdup in the borehole flowstream.

2. The tool of claim 1 wherein the long spaced detector and the short spaced detector are both disposed axially within a casing of the tool at different distances from the source.

3. The tool of claim 2 wherein the long spaced detector and the short spaced detector are disposed on opposite sides of the casing from each other.

4. The tool of claim 2 the long spaced detector and the short spaced detector are disposed on the same side of the casing.

5. The tool of claim 1 wherein each of the long spaced detector and the short spaced detector comprises a scintillation crystal and a photomultiplier tool optically coupled thereto.

6. A method for measuring gas holdup in a downhole borehole flowstream, the method comprising:
   (a) disposing within the borehole flowstream a low energy gamma radiation source that emits gamma radiation that emits gamma radiation in a range between 75 kiloelectron Volts (keV) and 150 keV;
   (b) disposing within the borehole flowstream a long spaced gamma ray detector;
   (c) disposing within the borehole flowstream a short spaced gamma ray detector; and
   (d) combining responses of the short spaced detector and the long spaced detector to the gamma rays scattered by interactions between the borehole flowstream and gamma radiation emitted by the low energy gamma ray source to obtain the measure of gas holdup.

7. The method of claim 6 further comprising correcting the measure of gas holdup for salinity and a degree of lamination within the borehole flow stream.

8. The method of claim 7 further comprising combining the responses of the short spaced detector and the long spaced detector to obtain a measure of salinity within the borehole flowstream and to obtain an indication of the degree of lamination within the borehole flowstream.

9. The method of claim 8 further comprising using an iteration technique to optimize the accuracy of the measures of gas holdup, salinity, and indication of the degree of flow lamination.

10. The method of claim 7 wherein each long spaced detector and short spaced detector comprises a scintillation crystal and a photomultiplier tool optically coupled.

11. The method of claim 7 wherein the source is $^{57}$Co.

12. A full-bore spectral gas holdup logging system for use in a flowstream within a cased borehole, the logging system comprising:
   (a) a spectral gas holdup tool comprising
      (i) a low energy gamma radiation source that emits gamma radiation in a range between 75 kiloelectron Volts (keV) and 150 keV,
      (ii) a long spaced spectral gamma radiation detector,
      (iii) a short spaced spectral gamma radiation detector, wherein responses of the short spaced spectral gamma radiation detector and the long spaced spectral gamma radiation detector to gamma radiation scattered from interactions between the flowstream and gamma radiation emitted by the source are recorded as count rates in predetermined gamma radiation energy regions, and count rates are combined to yield a measure of the gas holdup; and
   (b) a conveyance means and a data conduit for conveying the tool along the borehole.

13. The logging system of claim 12 wherein the measure of gas holdup is corrected for salinity and flow lamination within the flowstream.

14. The logging system of claim 13 wherein the short spaced spectral gamma radiation detector and the long spaced spectral gamma radiation detector count rates are combined to yield a measure of salinity and a degree of flow lamination within the flowstream.

15. The logging system of claim 14 wherein measurements of the gas holdup, salinity, flow lamination are iterated to maximize accuracy.

16. The logging system of claim 14 comprising at least one processor to:
   (a) define the predetermined gamma radiation energy regions;
   (b) record the count rates in the predetermined gamma radiation energy regions, and
   (c) combine the count rates to yield the measure of gas holdup, salinity, and flow lamination within the flowstream.

17. The logging system of claim 14 further comprising a gain stabilization circuit so that gains of the long and short spaced spectral gamma radiation detectors are stabilized using unscattered gamma radiation from the source.

18. The logging system of claim 13 further comprising determining an oil and water fraction of a liquid phase of the flowstream, wherein a salinity of the water fraction to be determined is known, and the short spaced spectral gamma ray detector and the long spaced spectral gamma ray detector count rates are combined to yield measures within the flowstream of:
   (a) gas holdup;
   (b) the water fraction;
   (c) the oil fraction; and
   (d) an indication of the degree of the flow lamination.

19. The logging system of claim 13 wherein each of the long and short spaced spectral gamma radiation detectors comprises a scintillation crystal and a photomultiplier tool optically coupled thereto.

20. The logging system of claim 13 wherein the source is $^{57}$Co.

21. The logging system of claim 12 wherein energy of gamma radiation emitted by the source and that penetrates the casing is sufficiently low in energy to not reenter the borehole via scattering.

22. The logging system tool of claim 12 further comprising an auxiliary sensor that determines an oil and water fraction of a liquid phase of the flowstream, wherein the short spaced gamma radiation detector and the long spaced gamma radiation detector count rates and a response of the auxiliary sensor are combined to yield measures within the flowstream comprising:
   (a) gas holdup;
   (b) a water fraction;
   (c) an oil fraction;
   (d) salinity of the water fraction; and
   (e) an indication of a degree of flow lamination.

23. The logging system of claim 12 further comprising:
   (a) determining oil and water fractions of a liquid phase of the flowstream with an auxiliary sensor; and
   (b) combining the short spaced spectral gamma ray detector and the long spaced spectral gamma ray detector count rates with a response of the auxiliary sensor to yield measures within flowstream including:
      (i) the gas holdup,
      (ii) a water fraction,
      (iii) an oil fraction,
      (iv) salinity of the water fraction, and
      (v) an indication of a degree of flow lamination.

24. The method of claim 23 further comprising conveying simultaneously the spectral gas holdup tool and the auxiliary sensor along the borehole.

25. The logging system of claim 12 further comprising: combining the short spaced spectral gamma ray detector and the long spaced spectral gamma ray detector count rates to yield measures within the flowstream including:
   (a) a water fraction;
   (b) an oil fraction; and
   (c) an indication of a degree of flow lamination.

26. A method for measuring full bore gas holdup flowstream within a cased borehole, the method comprising:
   (a) disposing a spectral gas holdup tool within the flowstream, wherein the spectral gas holdup tool comprises
      (i) a low energy gamma ray source that emits gamma radiation in a range between 75 kiloelectron Volts (keV) and 150 keV,
      (ii) a long spaced spectral gamma ray detector, and
      (iii) a short spaced spectral gamma ray detector;
   (b) obtaining count rate measurements in a plurality of predetermined gamma ray energy regions in counts per second responses of the short spaced spectral gamma ray detector and the long spaced spectral gamma ray detector to gamma rays scattered by interaction between the flowstream and gamma rays emitted by the source;
   (c) comparing the count rate measurements against response rate curves to yield the measure of the gas holdup; and
   (d) conveying the tool along the borehole during measurement.

27. The method of claim 26 further comprising correcting the measure of gas holdup for salinity and flow lamination within the flowstream.

28. The method of claim 25 further comprising comparing the short spaced spectral gamma ray detector and the long spaced spectral gamma ray detector count rates to yield a measure of salinity within the flowstream and to yield an indication of the degree of flow lamination.

29. The logging system of claim 28 further comprising iterating measurements of gas holdup, salinity, and indication of degree of flow lamination to maximize accuracy of the measurements.

30. The method of claim 28 comprising providing at least one processor to:
(a) define the predetermine gamma ray energy regions;
(b) record the count rates in the predetermined gamma ray energy regions; and
(c) combine the count rates to yield the measure of the gas holdup and the salinity and the flow lamination within the flowstream.

31. The method of claim 26 wherein energy of gamma rays emitted by the source and that penetrates the casing is sufficiently low in energy to not reenter the borehole via scattering.

32. The method of claim 26 further comprising stabilizing gains of the long spaced spectral gamma ray detector and the short spaced spectral gamma ray detectors using unscattered gamma rays from the source.

33. The method of claim 26 wherein each the long spaced spectral gamma ray detector and the short spaced spectral gamma ray detector comprises a scintillation crystal and a photomultiplier tool optically coupled thereto.

34. The method of claim 26 wherein the source is $^{57}$Co.

35. A borehole logging tool for measuring gas holdup in a borehole flowstream, the tool comprising:
(a) a low energy gamma radiation source that emits gamma radiation in a range between 75 kiloelectron Volts (keV) and 150 keV; and
(b) a gamma ray detector axially spaced from the nuclear source and responsive to gamma radiation scattered by interaction between the flowstream and the emitted gamma radiation; wherein
a first response of the detector is measured in a first gamma radiation energy region and a second response of the detector is measured in a second gamma radiation energy region; and
the first response and the second response are combined to yield the measure of gas holdup in the borehole flowstream.

36. The tool of claim 35 wherein the source is $^{57}$Co and wherein the first energy region is from 15 keV to 60 keV and the second energy region is greater than 60 keV.

37. The tool of claim 35 further comprising shielding disposed between the source and the gamma ray detector wherein the shielding allows for a predetermined small number of unscattered gamma rays to reach the detector to serve as a calibration energy peak.

38. The tool of claim 35 wherein first and second responses are combined to form a ratio of the first response to the second responses.

39. The tool of claim 35 wherein the tool is conveyed within a borehole with a wireline.

40. A method for measuring gas holdup in a borehole flowstream, the method comprising:
(a) disposing, within a tool, a low energy gamma radiation source that emits gamma radiation in a range between about 75 kiloelectron Volts (keV) and about 150 keV;
(b) within the tool, axially spacing a gamma ray detector from the nuclear source wherein the detector is responsive to gamma radiation scattered by interaction between the borehole flowstream and the emitted low energy gamma radiation;
(c) measuring a first response of the detector in a first energy region and measuring a second response of the detector in a second gamma radiation energy region;
(d) combining the first response and the second response to yield a measure of gas holdup, salinity and flow lamination in the borehole flowstream, and
(e) correcting the gas holdup measure with the salinity and flow lamination measures to yield a corrected gas holdup measurement.

41. The method of claim 40 wherein the source is $^{57}$Co.

42. The method of claim 41 wherein the first energy region is from 15 keV to 60 keV and the second energy region is greater than 60 keV.

43. The method of claim 40 further comprising forming a ratio of the response to the second responses.

44. The method of claim 40 further comprising conveying the tool within a borehole with a wireline.

\* \* \* \* \*